United States Patent [19]
Connell et al.

[11] Patent Number: 4,466,035
[45] Date of Patent: Aug. 14, 1984

[54] MAGNETO-OPTIC MEDIA AND SYSTEM OPTIMIZATION

[75] Inventors: G. A. Neville Connell, Cupertino; Masud Mansuripur, Mountain View, both of Calif.

[73] Assignee: Xerox Corporation, Stamford, Conn.

[21] Appl. No.: 352,498

[22] Filed: Feb. 25, 1982

[51] Int. Cl.$^3$ .................. G11B 5/32; G11B 3/64; G11B 7/28; G11C 13/06
[52] U.S. Cl. .................. 360/114; 365/122; 369/84
[58] Field of Search .................. 360/114; 346/135; 369/100, 84; 365/122; 350/375, 377

[56] References Cited

U.S. PATENT DOCUMENTS

| | | |
|---|---|---|
| 3,196,206 | 7/1965 | Griffiths . |
| 3,451,740 | 6/1969 | Smith . |
| 3,472,575 | 10/1969 | Hunt . |
| 3,474,428 | 10/1969 | Nelson . |
| 3,594,064 | 7/1971 | Bierlein . |
| 3,626,114 | 12/1971 | Lewicki . |
| 3,636,535 | 1/1972 | Cushner . |
| 3,815,151 | 6/1974 | Schmit . |
| 3,947,890 | 3/1976 | Travot . |
| 4,270,132 | 5/1981 | Bell . |
| 4,285,056 | 7/1981 | Bell . |
| 4,300,227 | 11/1981 | Bell . |
| 4,414,650 | 11/1983 | Ohta .................. 365/122 |

OTHER PUBLICATIONS

D. O. Smith–"Magnetic Films & Optics In Computer Memories" IEEE Transactions On Magnetics, vol. Mag-3(3) pp. 433–452 (9/1967).
D. O. Smith–"A Multilayer Dielectric-& Magnetic-Film Memory Cell . . . Optical Readout", JAP, vol. 35-3(PT2) pp. 772–773 (3/1964).
K. Egashira et al. –"Kerr-Effect Enhancement & Improvement of Read-Out Characteristics In MnBi Film Memory", JAP, vol. 45-48, pp. 3643–3648 (8/1974).
Shibukawa–"Kerr Readout Characteristics of MnCuBi Thin Films" JJAP, vol. 16-9, pp. 1601–1604 (9/1977).
R. L. Aagard et al. –"Advanced Optical Storage Techniques For Computers", Applied Optics, vol. 11-10, pp. 2133–2139 (10/1972).
Tu Chen et al., "An Investigation of Amorphous Tb-Fe Thin Films . . . Application"–IEEE Transactions On Magnetics, MAG-16(5) pp. 1194–1196 (9/1980).
E. W. Plugh–"Kerr Magneto-Optical Elements", IBM Tech. Disc. Bull., vol. 4, No. 8, p. 57, Jan. 1962.
J. H. Cassidy–"Magneto-Optically Generated Inputs in Optical Data Processing", Journal of Optical Soc. of America, vol. 61, No. 3, pp. 378–385, Mar. 1971.
Mansuripur–"Statistics of Noise In Photodetection: Applications In Magneto-Optical Recording"–PhD. Dissertation filed with Stanford University in Mar., 1981.
Mansuripur et al.–"Signal-to-Noise In Magneto-Optic Storage"–paper delivered to Society of Photo-Optical Instrumentation Engineers at Conference in Los Angeles, Calif., on Jan. 29, 1982.

*Primary Examiner*—Robert Martin Kilgore
*Attorney, Agent, or Firm*—W. Douglas Carothers, Jr.

[57] ABSTRACT

Magneto-optic media and system optimization including a set of optimized magneto-optic media for use in a magneto-optic recording and readout system employing an incident readout light beam of a given fixed power, $P_o$. The beam is delivered in a linearly polarized state to the magneto-optic media and the magneto-optic radiation received from the media is detectable by the system. Each member of the set of media comprises a reflective layer having a predetermined thickness, a first transparent layer overlying the reflecting layer and having a predetermined thickness and refractive index and a second light transmissive layer having a predetermined thickness and exhibiting absorptivity at the wavelength of said incident readout light beam and having magneto-optic conversivity and perpendicular anisotropy. Members of the set of optimized magneto-optic media may further included a third transparent layer overlaying the second transmissive layer and having a predetermined thickness and refractive index. The combination of these layers exhibit antireflectivity and the incident light absorbed in the media is captured in the second light transmissive layer and the predetermined layer thicknesses and refractive index are chosen to maximize signal to noise ratio (SNR) according to the relationship $$SNR = f(r_x, r_y, P_o, \{a_i\}_{i=1}^{N})$$

where $r_x$ represents the reflected component of the linearly polarized incident beam $r_y$ represents the reflected magneto-optically induced component in an orthogonal direction, $a_i$ is the $i^{th}$ element of the set $\{a_i\}$ that represents variable parameters of the chosen readout system, N is the number of elements in the set $\{a_i\}$ and f is a function which is determined by the chosen readout system.

25 Claims, 16 Drawing Figures

MAGNETO-OPTIC MEDIA AND SYSTEM OPTIMIZATION

BACKGROUND OF THE INVENTION

This invention relates to improvements in magneto-optic media and recording and readout systems for such media to improve recording and readout performance. In particular, this invention relates to optimization of magneto-optic media for maximum signal to noise ratio (SNR) in an optimized differential readout system with enhanced recording and readout performance being further enhanced by maximum efficient use of available read/write laser powers optimized relative to designed media parameters.

In the present prior art, there are extensive teachings relating to the enhancement of Kerr magneto-optic readout effects in magneto-optic readout systems by improving properties and parameters of the recording medium or of the detection system employed for readout. These enhancements are aimed at greater Kerr rotation and contrast in the Kerr magneto-optic effect by rotation of the plane of polarization of electromagnetic radiation on reflection or transmission. A large volume of this art occurred in the decade of the 1960's and into the early 1970's. Representative examples of earlier magneto-optic readout reflective and transmissive systems can be found in U.S. Pat. Nos. 3,472,575; 3,626,114; 3,815,151 and 3,947,890. Other references include the work of D. O. Smith, representative examples of which are the articles, "Magnetic Films & Optics in Computer Memories", *IEEE Transactions on Magnetics*, Vol. Mag-3, No. 3, pp. 433-452 (September, 1967) and "A Multilayer Dielectric- & Magnetic-Film Memory Cell Designed For Optical Readout", *Journal of Applied Physics*, Volume 35-3 (Part 2), pp. 772-773 (March 1964).

The magneto-optic work of D. O. Smith pertained primarily to magneto-optic longitudinal Kerr effect as applied to magneto-optic transducers employed for magnetic film readout of magnetic films or members having in-plane magnetization. Representative examples of this art are found in U.S. Pat. Nos. 3,196,206; 3,451,740, 3,474,428; 3,594,064 and 3,636,535.

All this art, whether for applications directed toward storage memory or readout transducers, is directed to the improvement of readout characteristics in magnetic films having the easy axis of magnetization in the plane of the magnetic film. Improvements are realized by increase of the Kerr rotation reflected from the magnetic film with an ultimate goal of enhancement of Kerr effects to an optimum value.

Studies also have been made relative to ferromagnetic and ferrimagnetic films toward Kerr effect enhancement and improved readout characteristics. Enhancement of the Kerr effect has been studied in magnetic films, e.g. MnBi, having perpendicular anisotropy. These films were coated with a dielectric transparent layer, e.g. SiO or $SiO_2$ to enhance the Kerr effect. K. Egashira and T. Yamada, "Kerr-Effect Enhancement & Improvement Of Readout Characteristics In MnBi Film Memory", *Journal of Applied Physics*, Vol. 45-8, pp. 3643-3648 (August, 1974), A. Shibukawa, "Kerr Readout Characteristics of MnCuBi Thin Films", *Japanese Journal of Applied Physics*, Vol. 16-9, pp. 1601-1604 (September 1977), R. L. Aagard, T. C. Lee and D. Chen, "Advanced Optical Storage Techniques for Computers", *Applied Optics*, Vol. 11-10, pp. 2133-2139 (October, 1972) and Tu Chen, D. Cheng and G. B. Charlan, "An Investigation of Amorphous Tb-Fe Thin Films For Magneto-Optic Memory Application", *IEEE Transactions on Magnetics*, Mag-16, No. 5, pp. 1194-1196 (September, 1980).

The film media studied have been generally bilayer magneto-optic recording media. The readout signal-to-noise ratio (SNR), being recognized as a function of the Kerr rotation, ellipticity and reflectivity, was discussed and analyzed for improvement of readout. The dependence of the readout SNR on the thickness of the dielectric overlayer can be expressed as a function of the Kerr rotation, ellipticity and reflectivity and a determination of film thickness can be made to increase Kerr rotation and Kerr polar, transverse or longitudinal effects. Thus, the use of a light transparent overlayer or underlayer with a magneto-optic layer may be applied with optimized thickness to enhance the Kerr conversivity. In particular, see the first mentioned of the two previously identified D. O. Smith articles, page 442, U.S. Pat. No. 3,594,064 disclosing a conversion matching underlayer and the previously identified Egashira et al article employing a SiO overlayer.

The use of light transparent underlayers for enhancement of direct recording of information in an optical recording overlayer is known in the optical recording and readout arts. Referred to as trilayer recording media, information is produced in the recording layer as a physical topographical feature such as an ablation or bubble. Representative examples of this type of recording media are found in U.S. Pat. Nos. 4,270,132; 4,285,056 and 4,300,227. A thin layer of optical record-retention properties is highly absorptive at the incident light beam wavelength. The thickness of the light absorptive record layer is so related to the thickness of the light transparent underlayer that overlies a reflective surface, together with the selection of desired optical constants of the medium layers, are such that the optical reflectivity of the medium can be made minimal. In other words, an antireflective condition is established in the absorptive recording layer and a highly efficient heating of the absorptive layer can be caused by the incident beam to bring about a topographical featural change in the record layer.

While it is clear from all these teachings that light transparent overlayers or underlayers with optimized thickness may enhance the Kerr effect and the antireflection quality of the recording layer, it has not been clear how these principles and contiguous light transparent layers might be applied to magneto-optic recording media with perpendicular anisotropy to achieve enhancement of the polar Kerr conversivity and optimized SNR.

D. O. Smith, in the 1960's, recognized the importance of one or more light transparent layers above and/or beneath a light transmissive layer having magneto-optic conversivity toward the optimization of magneto-optic radiation output. He also recognized that the Kerr rotation can be made as large as desired by use of antireflection dielectric coatings to render the regular component of reflected light just about zero. He then commented, "... it is clear that a measurement of the resultant enhancement [Kerr rotation] does not elucidate the extent to which the basic magneto-optical interaction in the magnetic material has been enhanced, if at all, by the use of antireflection layers". [D. O. Smith, "Magnetic Films & Optics In Computer Memories", supra, page 443].

SUMMARY OF THE INVENTION

The primary objective of this invention is to enhance the magneto-optical intensity exiting a magneto-optic medium but not at the expense of eliminating normally reflected light caused by the incident readout light.

According to this invention, this objective is achieved by optimization of magneto-optic media for maximum signal to noise ratio (SNR) in an optimized differential readout system with enhanced recording and readout performance being further enhanced by maximum efficient use of available read/write laser powers optimized relative to designed media parameters.

SNR improvements are achieved for a trilayer magneto-optic medium comprising a substrate with a reflecting surface, a first or intermediate light transparent layer over the reflecting surface and a second light transmissive layer over the first transparent layer exhibiting absorptivity and magneto-optic conversivity and, also, for a preferred quadrilayer magneto-optic medium, which is the same as a trilayer medium except for the inclusion of a third light transparent layer over the second light transmissive layer to protect the latter from the environment as well as providing an extra degree of freedom in optimization.

These improvements are brought about by a new approach for a mathematical model for SNR and choosing medium and system parameters, based upon considerations derived from SNR relationships, to optimize the magneto-optic intensity deliverable from trilayer and quadrilayer magneto-optic media. The combination of the layers comprising these media must exhibit antireflectivity with the incident light absorbed in the media captured in the second light transmissive layer and the predetermined layer thicknesses and refractive index are chosen to maximize SNR according to the relationship, $$SNR = f(r_x, r_y, P_o, \{a_i\}^N)$$
$$i = 1$$

where $r_x$ represents the reflected component of the linearly polarized incident beam, $r_y$ represents the reflected magneto-optically induced component in an orthogonal direction, $a_i$ is the $i^{th}$ element of the set $\{a_i\}$ that represents the variable parameters of the chosen readout system, N is the number of elements in the set $\{a_i\}$ and f is a function which is determined by the chosen readout system.

Maximization of magneto-optic intensity from the media is achieved such that the thickness of the first transparent and the second transmissive layers are selected to have the following attributes: (1) almost all incident light is captured in the second transmissive layer to provide the maximized creation of magneto-optic radiation in this layer, (2) the thickness of the second layer is less than the absorption depth of the material comprising this layer so that magneto-optic radiation will exit the layer with minimal reabsorption, (3) magneto-optic radiation rearward exiting the second layer toward the reflecting layer undergoes reflection wherein the reflected light is in phase with the forward exiting radiation thereby increasing the emitted magneto-optic radiation in the forward direction and (4) the angular distribution of the total emitted magneto-optic radiation is strongly concentrated in a globe centered about the forward direction of emission with a field pattern characteristic of quadripole radiation thereby permitting maximum collection by detection system optics of finite numerical aperture.

SNR is further enhanced by the optimization of the magneto-optic recording and readout system and the selection of variable parameters of the chosen readout system, i.e., the parameter set $\{a_i\}$. By choosing, for example, the differential readout type of system, improvements to SNR can be realized by the enhancement of the system gain by employing avalanche photodiodes ($a_1$) and by employing an input phase plate ($a_2$). With optimized media and system parameters according to the mathematical model for SNR, media can be accurately designed, and, in particular, proper magneto-optic layer thickness can be determined for maximum efficient utilization of available read/write laser power.

In order to achieve the objective of this invention in an accurate and efficient manner, maximized SNR and optimized differential readout system are considered separately from optimium utilization of laser powers available.

Other objects and attainments together with a fuller understanding of the invention will become apparent and appreciated by referring to the following description and claims taken in conjunction with the accompanying drawings.

DESCRIPTION OF THE PREFERRED EMBODIMENTS

I. Magneto-optic Recording and Readout

Magneto-optic recording involves a medium that includes a light transmissive layer or film that exhibits absorptivity and magneto-optic conversivity. The film magnetization, M, may exhibit in-plane or perpendicular anisotropy. In the present invention we are concerned with perpendicular anisotropy. In the presence of a magnetic field, the film may be heated to a point sufficient to cause the magnetic regions of the film to be all oriented in one direction normal to the plane of the film. Alternatively, this can be accomplished by the application of a large magnetic field alone.

When recording, the incident laser beam is modulated on the surface of the film. Laser power is sufficient to heat the film locally and in the presence of a small reverse magnetic field to reverse the direction of magnetization of the regions addressed by the beam. The temperature characterizing the onset of the writing process is the Curie temperature of the material.

Figure 1:
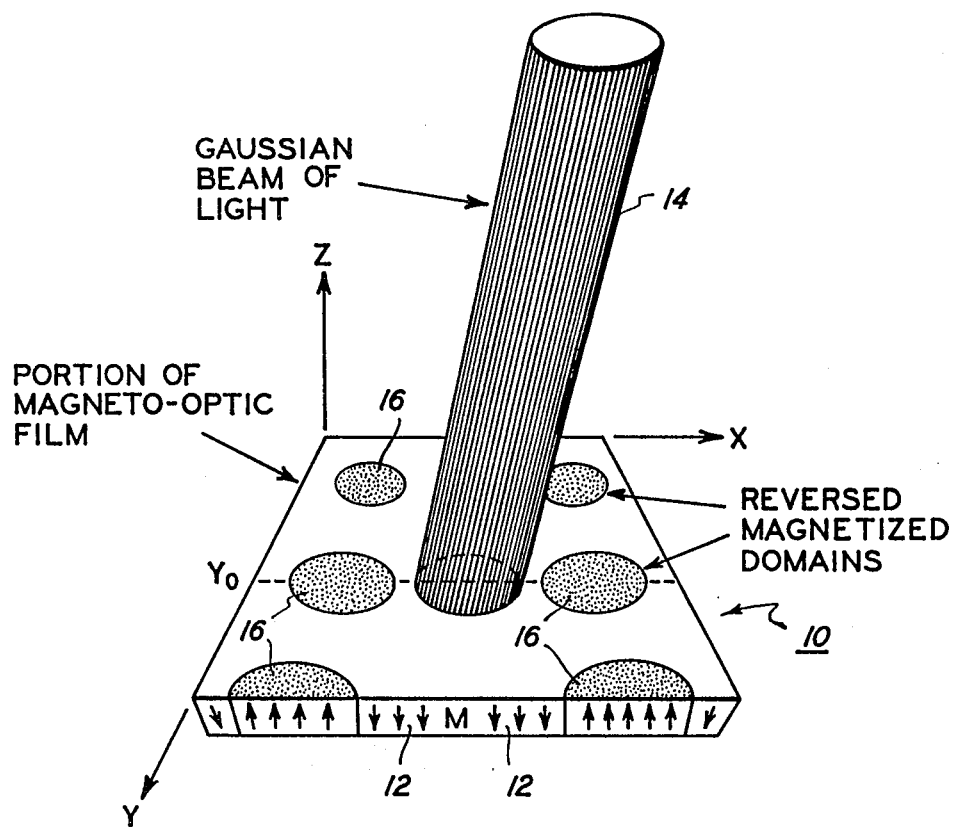
FIG. 1 is a schematic diagram of a portion of a magnetic layer of a magneto-optic medium illustrating magnetized regions in the magnetic layer.

In FIG. 1, a small portion of a magneto-optic film 10 is illustrated in the X-Y plane. Normal magnetization, M, of the film 10 is shown at 12 as being downward. A modulated laser beam 14, having normal incidence to the surface of the film 10 parallel to the Z axis, causes a reversal of magnetized regions forming spots 16. These minute spots are representative of encoded information. A focused spot from beam 14 may typically produce spots 0.5 to 1 $\mu$m in diameter.

Upon readout, the light received from the medium is of low intensity. The beam 14 of linearly polarized light, normally incident (Z axis) to the plane of the film 10, is focused on a recorded track, $Y_o$, as the medium is rotated or moved. The spots 16 of reversed magnetized regions produce a reversal of the rotation and ellipticity of the polarized reflected light as the readout beam sweeps across the $Y_o$ track spots. The magnitude of this change in polarized light relative to the incident beam is rather small. Typically the rotation angle and the ellipticity change by only about 0.4 or 0.5 degrees. Thus, it is crucial to establish a detection scheme and media design that make the best use of this effect.

The incident beam 14 may be one employed for both read and write applications or may consist of separate beams.

Figure 2:
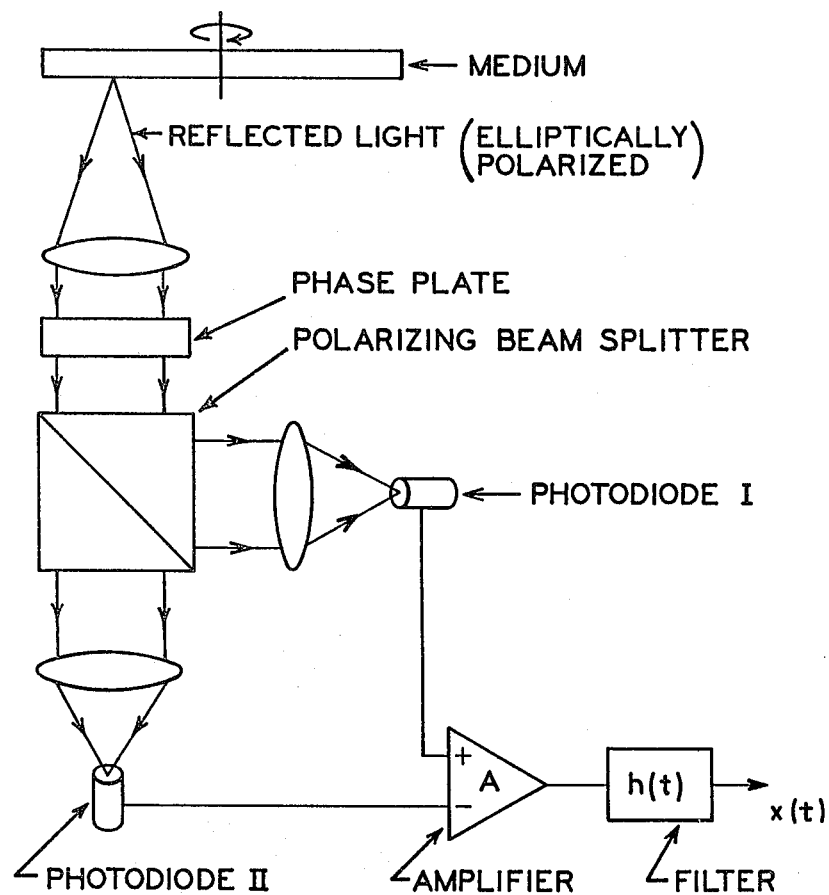
FIG. 2 is a schematic diagram of a differential readout detection system for detecting magneto-optic radiation emitted from a magneto-optic medium.

FIG. 2 discloses the readout detection scheme employed. This scheme is generally disclosed in the previously mentioned article of R. L. Aagard et al. However, there are two important differences. First, in this scheme, the elliptically polarized reflected light is first made linear by a suitably adjusted phase plate, i.e., having the proper thickness. The phase plate provides a fixed or variable phase retardation to render the Kerr rotation and ellipticity additive.

Secondly, photodiodes are employed to take advantege of the high avalanche gain available in their electrical signal output. As will be evident in later discussion, sufficiently high gain will substantially nullify the effects of thermal noise in the differential amplifier. Both of these factors together contribute to the improvement of SNR.

In FIG. 2, light received by the system via the phase plate is split into two halves by a polarizing beam splitter such that each half is focused to be detected by separate avalanche photodiodes, photodiodes I and II. As is known, one half of the light from the splitter experiences an increase while the other half of the light experiences a decrease. The two output signals from photodiodes I and II are fed to a differential amplifier. The amplified signal from the amplifier is directly proportional to the intensity of the polar Kerr effect. The amplified signal may then be processed by a filter. The primary function of this filter is to eliminate noise components outside the signal bandwidth. The filter may also be designed to minimize the effects of smoothing and optimize the SNR.

We developed a criterion for optimum performance of a recording and readout system employing a magneto-optic medium by examining and then defining the signal-to-noise (SNR) toward enhancement of the polar Kerr effect. The polar Kerr enhancement is caused when an incident polarized beam experiences multiple reflections and interferences due to the optical constants and designated layer thicknesses of the light transparent and transmissive layers comprising the medium. By satisfying the relationship of these parameters, some enhancement can be achieved due to changes in Kerr rotation, ellipticity and reflectivity. Enhancement is generally accompanied by an increase in ellipticity and Kerr rotation of the reflected light and a reduction in the reflectivity. SNR analysis is important since SNR is related to these changes. Proper SNR is imperative toward understanding the relationship of these changes toward achieving a meaningful maximization of those changes for a particular medium configuration.

Figure 3:
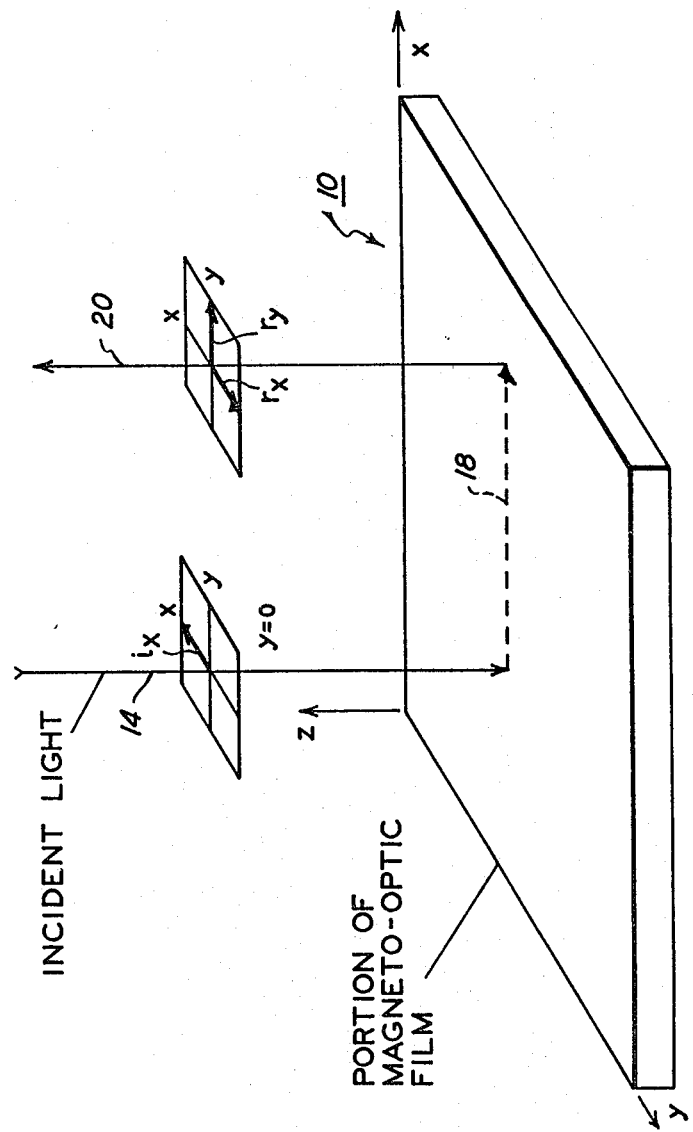
FIG. 3 is a conventional schematic representation of linearly polarized incident light directed to a magneto-optic medium and the reflected light therefrom which includes a magneto-optically induced component

FIG. 3 is a simple illustration of the effect of a polarized light beam on a magnetic film with perpendicular anisotropy. In this illustration, an incident beam 14 is applied normal to the surface of a magnetic film 10. Beam 14 is linearly polarized in the X direction and is represented by the component, $i_x$. The reflected light 20 from the film 10 is shown offset from the incident beam 14 for purposes of illustration. The dotted line 18 represents creation of magneto-optic radiation within the magnetic film bulk, which radiation exits as reflected light 20. Due to the magnetic properties of the film 10, the reflected light 20 has a regular component, $r_x$, and a magneto-optically induced component, $r_y$, where $r_x$ and $r_y$ are complex. The magnitude of the polar Kerr effect, $|r_y|$ is determined both by the internal conversivity of the film 10 and by the ability to introduce light into and remove magneto-optic radiation from the entire medium such that maximum conversion occurs, as measured outside the medium bulk. This latter aspect is much affected by interference effects within the medium structure and with considerable enhancement of $|r_y|$ over its value for a selected medium configuration.

II. Magneto-Optic Media

The simplest medium configuration is a light transparent layer on a magneto-optic layer as disclosed in the previously mentioned article of K. Egashira et al. A dielectric antireflection coating, e.g., SiO, is deposited on a thin ferromagnetic film of MnBi. A small gain in magneto-optic radiation is achieved because more incident light enters the magneto-optic layer. However, this bilayer medium is not effective in either increasing the efficiency of conversion within the magneto-optic medium itself or increasing the collection of created magneto-optic radiation.

Figure 4:
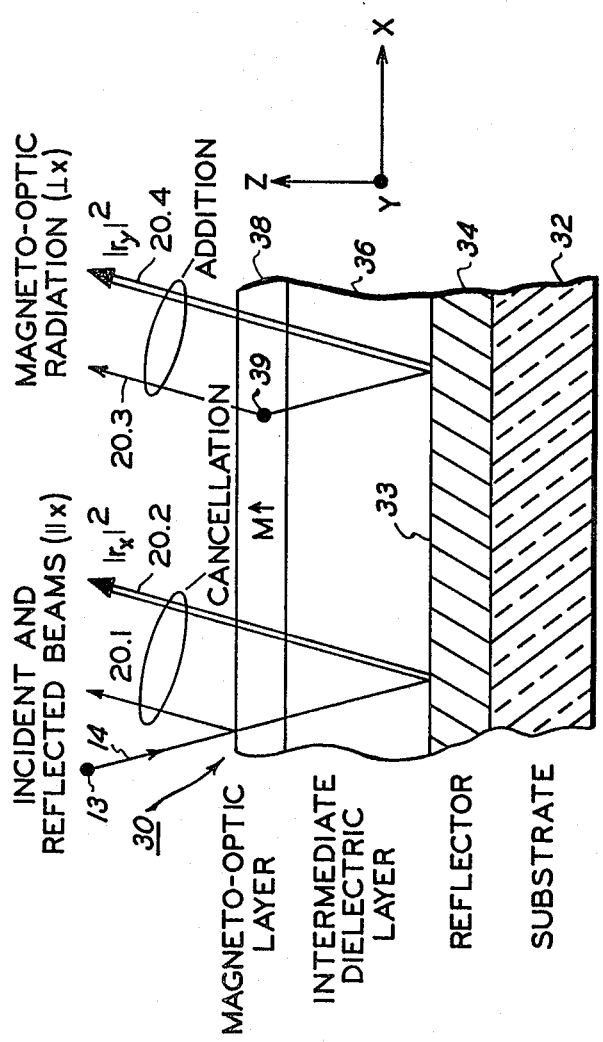
FIG. 4 is a schematic representation of a trilayer configuration for a magneto-optic medium comprising this invention.

In contrast, we have considered mediums having an intermediate dielectric layer between a reflecting surface and the magneto-optic layer. In FIG. 4, a magneto-optic trilayer medium 30 is shown and comprises a substrate 32 which either has an opaque, high reflective surface 33 or a deposited opaque reflector 34 which has a high reflective surface 33. A first light transparent layer 36 is deposited on surface 33 followed by the deposition of a second light transmissive layer 38 exhibiting absorptivity and magneto-optic conversivity at the selected incident beam wavelength. Layer 36 may, for example, comprise SiO or $SiO_2$ and layer 38 may, for example, comprise MnBi. The substrate 32 may be Al, glass or PMMA. The reflector 34 may be of Al.

Figure 5:
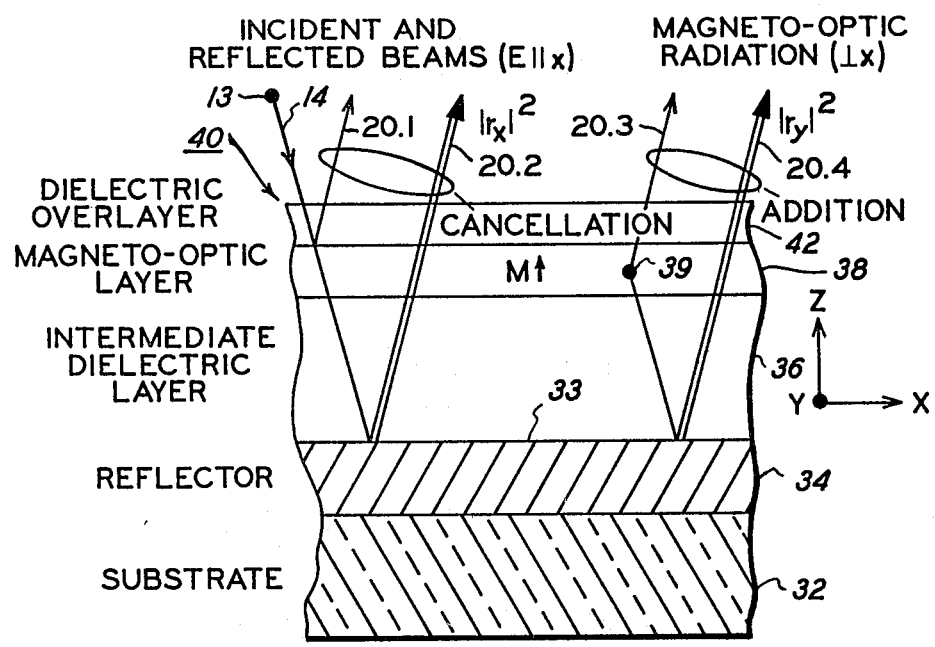
FIG. 5 is a schematic representation of a quadrilayer configuration for a magneto-optic recording comprising this invention.

The magneto-optic quadrilayer medium 40 of FIG. 5 is the same as the trilayer medium 30 of FIG. 4 except for a third light transparent or overlayer 42 deposited on magneto-optic layer 38. Layer 42 provides for protection of the magneto-optic layer from the environment and, if required, may reduce or increase or not effect reflectance and/or conversivity.

In FIGS. 4 and 5, the incident light beam 14 from a source 13 is plane polarized with $E \parallel X$. The reflected beam with $E \parallel X$ may then be considered to consist of two beams, one beam 20.1 reflected from magneto-optic layer 38 and overlayer 42 and the other beam 20.2 from a superposition of all beams reflected at least once, if not several times, from surface 33 due to multiple reflections at layer interfaces. Similarly, magneto-optic radiation, which has $E \perp X$, may be considered to consist of two forms of emitted radiation. One form 20.3 comprises magneto-optic radiation created in the magneto-optic layer 38 (represented as a radiation source 39) due to its absorptivity and emitted in forward direction normal to the plane of layer 38. The other form 20.4 is from a superposition of all magneto-optic radiation emitted in a backward direction from source 39, normal to the plane of layer 38, and a superposition of such radiation reflected at least once, if not several times, from surface 33 due to multiple reflections at layer interfaces.

It should be observed, that the representations of incident and reflected beams, and magneto-optic radiation in FIGS. 4 and 5 are shown at an angle relative to the planar extent of the media only for illustrative purposes, as these beams and radiation are, in fact, normal to the planar extent of the medium.

The optical and thermal constants of the materials comprising the media layers and the thickness of the layers must be selected for optimization of the SNR.

The parameters of the layers of the media 30 and 40 must be adjusted for appropriate interference of the beams and radiation to produce desired cancellation and addition, respectively. The thickness of layers 36 and 38 as well as the materials for these layers are chosen to provide the maximized creation of magneto-optic radiation in layer 38. This is accomplished by making the thickness of layer 36 and layer 38 so that $r_x$ is about zero, that is, an antireflection condition is established. This occurs because the beam 20.1 reflected directly from layer 38 is cancelled by light which has suffered at least one reflection from the reflector surface 33. To achieve this, the optical thickness of the dielectric layer 36 must be approximately $(2m+1)\lambda/4$, where $\lambda$ is the wavelength of the incident light and $m = 0, 1, 2, 3 \ldots$. In actual practice $m = 0$ is adequate for most purposes. With a perfect opaque reflector, all incident beam intensity will be absorbed into layer 38.

The thickness of layer 38 is made to be less than the absorption depth of the material comprising the layer to minimize reabsorption of magneto-optic radiation. Magneto-optic induced radiation ($E \perp X$), which is emitted both forward and backward from layer 38, suffers relatively little reabsorption in the thin absorbing magnetic film. The interference conditions that are adjusted to create total absorption of the incident beam are exactly those required to maximize $|r_y|$ by in-phase addition of radiation components emitted from the surface of media. Thus, a large interference enhancement of $|r_y|$ will occur.

Also, the angular distribution of the total emitted in-phase magneto-optic radiation is strongly concentrated in a globe, similar in shape to a tear drop. This globe-shaped radiation is centered about the forward direction of radiation emission normal to the planar extent of the media with a field pattern characteristic of quadrupole radiation thereby permitting maximum radiation collection by detection optics of finite numerical value.

Figure 6:
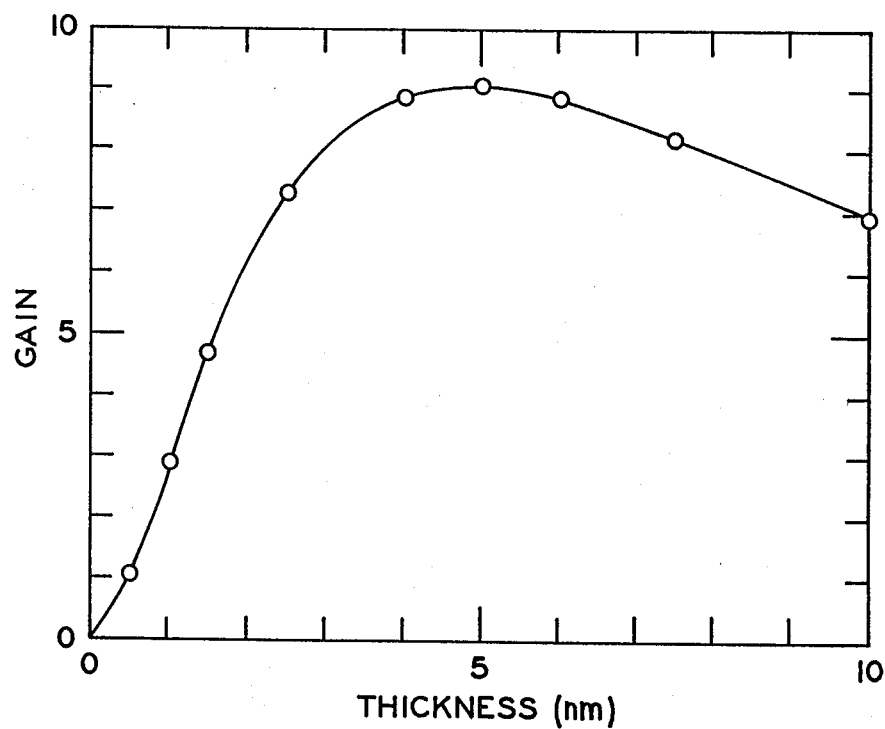
FIG. 6 is a graphic illustration of the polar Kerr intensity versus the thickness of the magnetic layer for the magneto-optic medium of FIG. 5.

As an example, the gain, i.e., enhancement of the polar Kerr intensity, $|r_y|^2$ in MnBi, as a material for layer 38, versus thickness variation of the MnBi layer is shown in FIG. 6. The results shown were obtained for an incident light-beam having a wavelength of 6328 Å. A maximum gain of close to an order of magnitude is obtained at a thickness equal to about 5 nm. From this discussion and these results, the importance of the trilayer and quadrilayer media for obtaining maximum SNR during magneto-optic readout is intrinsically clear. This leads to a quantitative analysis of the power spectral density of the read signal and the SNR obtainable from the differential detection scheme of FIG. 2.

III. SNR in the Differential Detection Scheme

A function $Z(X,Y)$ on the X-Y plane of FIG. 1 is defined to represent the encoded information pattern. The function has a value of $+1$ wherever a bit is written and $-1$ elsewhere. The Gaussian incident beam 14 has a total power $P_o$ and a radius $r_o$ at the $e^{-1}$ point. The assumption is made that beam 14 is moving in the X direction with constant velocity, V, and with the Y coordinate of the beam center fixed at $Y = Y_o$. The effect of the spread of the beam in the Y direction is then to create an effective information train $Z°(Vt, Y_o)$ where $$Z°(Vt, Y_o) = (\pi r_O^2)^{-\frac{1}{2}} \int_{-\infty}^{\infty} Z(Vt, Y)\exp[-(Y-Y_o)^2/r_o^2]dY. \quad (1)$$

Thus, cross-talk between neighboring recording tracks and a reduction of the signal occurs when $r_o$ is large compared with the bit radius and the interval between record tracks.

Defining the power spectral density of the effective information train as $$S_{Z°}(\omega) = \lim_{T\to\infty} E\{(1/T)| \int_{-\frac{1}{2}T}^{\frac{1}{2}T} Z°(Vt, Y_o)\exp(-i\omega t)dt|^2\}, \quad (2)$$

we can show that the power spectral density of the signal observed at the output of the differential detection system can be written as $$S(\omega) = (2\eta P_o <G> |r_x| \cdot |r_y|)^2 \exp[-\frac{1}{2}(\omega r_o/V)^2]|H(\omega)|^2 S_{Z°}(\omega) \quad (3)$$

where $\eta$ is the conversion factor of photodiodes, $<G>$ is the avalanche gain of the photodiodes I and II, and $H(\omega)$ is the frequency response of the detection system.

The presence of the factor $\exp[-\frac{1}{2}(\omega r_o/V)^2]$ in Equation 3 is due to the spread of the read beam in the x direction. This is a bell-shaped function of frequency which, roughly speaking, attenuates the components of $S_{Z°}(\omega)$ located at $\omega > \omega_o = V/r_o$. If the distance between the centers of neighboring bits on the same track is $r_1$, the important frequencies in the signal are around $\omega_1 = V/r_1$. Hence, a large $r_1/r_o$ is required if smoothing is to be minimal.

The output signal is, of course, accompanied by noise from several sources. Of these, the most important considerations are the effects of shot noise in photodetection and thermal noise in the electronic circuitry. Their power spectral density is $$N(\omega) = [2i_n^2 + e\eta P_o F_G <G>^2(|r_x|^2 + |r_y|^2)]|H(\omega)|^2 \quad (4)$$

where e is the electronic charge, $i_n$ is the r.m.s. thermal noise current referred to the output of each photodiode, $F_G$, the avalanche noise factor associated with the photodiodes I and II is an increasing function of $<G>$. $F_G$ is known in the art to have the following dependence on $<G>$:

$$F_G = K<G> + (1-k)[2-<G>^{-1}] \quad (5)$$

where k is the ionization ratio of the photodiode. With proper normalization, the noise bandwidth B of the system can be defined as $$B = \frac{1}{2}\int_{-\infty}^{+\infty}|H(\omega)|^2 d\omega \quad (6)$$

and the signal to noise ratio finally written as $$SNR = \frac{2\eta P_o |r_x|^2 \cdot |r_y|^2}{B\{eF_G(|r_x|^2 + |r_y|^2) + 2i_n^2/(\eta P_o <G>^2)\}} \quad (7)$$

The factor $$\int_{-\infty}^{+\infty} \exp[-\frac{1}{2}(\omega r_o/V)^2]|H(\omega)|^2 S_{Z°}(\omega)d\omega$$

has been set equal to unity in Equation 7, corresponding to $r_o$ equal to zero. This still results in correct relative values of SNR even for realistic situations in which $r_o$ is not equal to zero because the integral is independent of the parameters that should be optimized.

For a maximum SNR, Equation 7 immediately suggests several system requirements. First, the read power, $P_o$, should be as large as possible. However, $P_o$ cannot be made very large because the heat induced in the medium will then reduce the signal sharply and may possibly obliterate or erase recorded spots 16. For a given medium structure, therefore, $P_o$ has an upper limit. But the media can be designed to efficiently utilize a given write laser power to increase the read power, $P_o$.

Second, the avalanche gain $<G>$ should be optimized. The denominator of Equation 7 is a function of $<G>$ and can be minimized with respect to it. With $F_G$ as given in Equation 5, this amounts to calculating the roots of a third degree polynomial which can be found in standard mathematical handbooks.

Since enhancement of magneto-optic response by multilayer considerations results in a small value for $|r_x|^2$, one can see from Equation 7 that avalanche detection is important in a detection system. Basically, the presence of $<G>^2$ in the term, $2i_n^2/(\eta P_o <G>^2)$ means that the termal noise is effectively reduced to very small values in comparison with the other term in the denominator of Equation 7, which represents shot noise. With regard to shot noise, reduction of $|r_x|^2$ is of no major consequence while, concurrently, Shot noise is not of major consequence so that, in effect, the reduction of $|r_x|^2$ creates no harm while, concurrently, $|r_y|^2$ may be increased resulting in SNR enhancement. In other words, if $<G>$ is sufficiently large, the term, $2i_n^2/(\eta P_o <G>^2)$, becomes insignificant so that $$SNR \approx \frac{|r_x|^2 \cdot |r_y|^2}{|r_x|^2 + |r_y|^2}.$$

Thus, $SNR \approx |r_y|^2$ for values of $|r_y|^2 << |r_x|^2$.

Third, the structure of the medium should be optimized. With the aid of an appropriate interference mechanism, it is possible to increase $|r_y|$ at the expense of $|r_x|$, as previously indicated. The optimum structure then corresponds to a compromise between $|r_x|$ and $|r_y|$ that results in the maximum SNR. In the next section, we consider this optimization problem versus disk structure, assuming that the limit on read power $P_o$ is set by the availability of a given amount of laser power for writing. How these results are affected when different write powers are available is discussed in Section VI.

In summary, Equation 7 suggests that the combination of the intermediate transparent layer and the the second magnetic transmissive layer should exhibit antireflectivity and that the incident light absorbed in the media is captured in the second light transmissive layer and that predetermined layer thicknesses and refractive index are chosen to maximize SNR according to the relationship $$SNR = f(r_x, r_y, P_o, \{a_i\}_{i=1}^{N})$$

where $r_x$ represents the reflected component of the linearly polarized incident beam, $r_y$ represents the reflected magneto-optically induced component in an orthogonal direction, $a_i$ is the $i^{th}$ element of the set $\{a_i\}$ that represents the variable parameters of the readout system, N is the number of elements in the set $\{a_i\}$ and f is a function which is determined by the readout system chosen.

IV. Media Optimization at Fixed Laser Power

The results relative to SNR in the differential detection scheme of FIG. 2 are employed to design a medium structure that provides the maximum SNR for a fixed laser power. For concreteness, the differential detection system in FIG. 2 is characterized by the parameters set forth in Table I.

TABLE I

Numerical Values for the Parameters of the Differential Detection System

| Parameter | Definition | Numerical Value |
|---|---|---|
| $\eta$ | Conversion Factor of Photodiodes | 0.5 A/W |
| $P_o$ | Laser Read Power | 2 μW |
| $\lambda$ | Wavelength of Light | 8400Å |
| B | System Noise Bandwidth | 10 MHz |
| k | Ionization Ratio of Photodiodes | 0.02 |
| $i_n$ | Thermal Noise Current | $3.6 \times 10^{-12}$ A·Hz$^{-\frac{1}{2}}$ |

The mediums chosen comprise a substrate 32 of glass, a magneto-optic layer 38 of TbFe, an intermediate dielectric layer 36 of SiO$_2$ or SiO, a dielectric overlayer 42 of SiO$_2$ or SiO and a reflector 34 of Al. The optical and thermal constants chosen are shown in Table II.

TABLE II

| | Optical and Thermal Constants of the Materials | | | |
|---|---|---|---|---|
| Material | n$^+$ | n$^-$ | Specific Heat C (J/Cm$^3$/°K.) | Heat Conductivity K (J/Cm/Sec/°K.) |
| SiO$_2$ | 1.50 | 1.50 | 2.0 | .015 |
| SiO | 2.00 | 2.00 | 2.0 | .015 |
| Al | 2.00 + 7.10 i | 2.00 + 7.10 i | 2.7 | 2.4 |
| TbFe | 3.77 + 3.92 i | 3.56 + 3.79 i | 3.2 | 0.4 |

Figure 7:
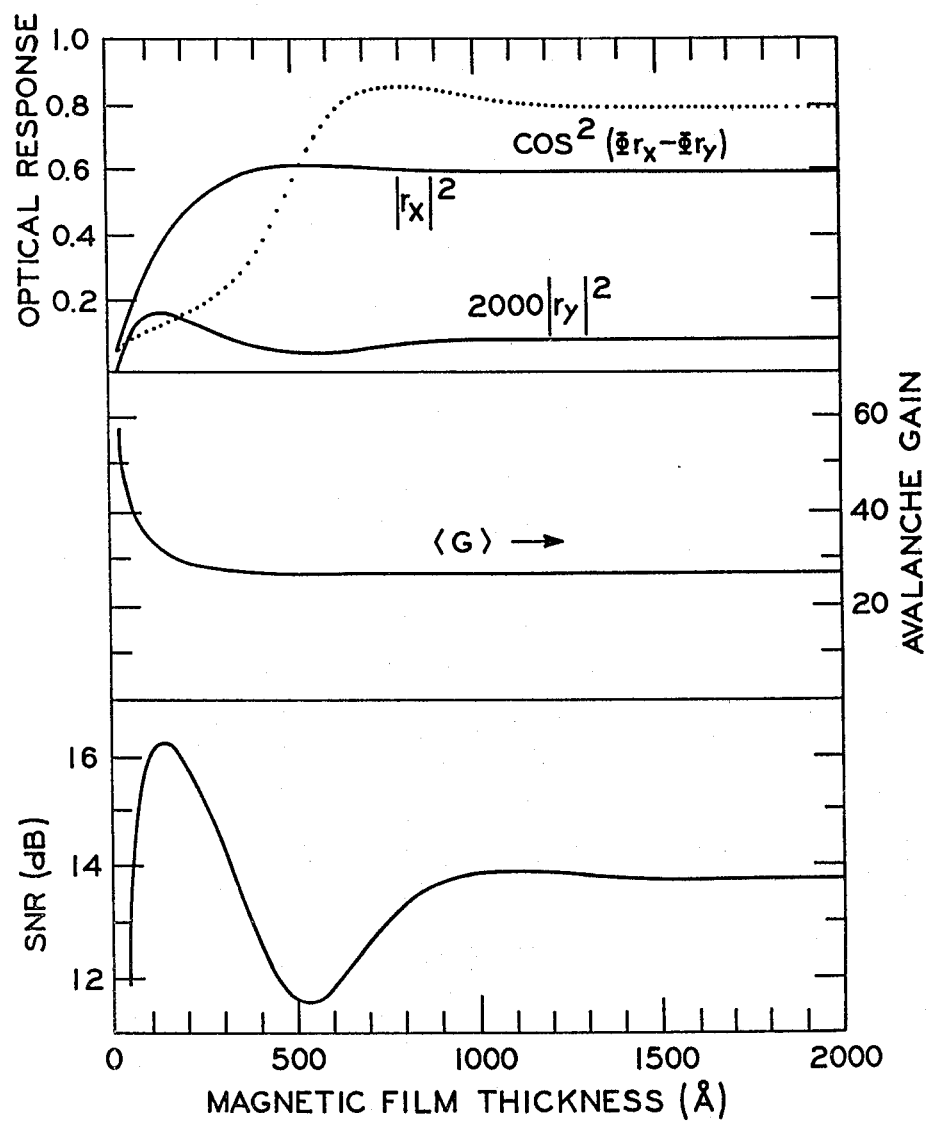
FIG. 7 is a graphic illustration of readout characteristics of a simple magneto-optic layer deposited on a glass substrate.

As a baseline for theoretical comparison of results, a bilayer medium, comprising a TbFe magnetic layer 38 deposited on a glass substrate 32, was examined with the results shown in FIG. 7. A quadrilayer medium, comprising a TbFe magneto-optic layer 38 and an SiO$_2$ intermediate dielectric layer 36 and an SiO$_2$ dielectric overlayer 42 on a glass substrate 32 with a reflector 34 was examined with the results shown in FIG. 8. Another quadrilayer medium, comprising a TbFe magneto-optic layer 38 and a SiO intermediate dielectric layer 36 and an SiO dielectric overlayer 42 on a glass substrate with a reflector 34, was examined with the results shown in FIG. 9.

In FIG. 7, the characteristics of readout for the bilayer medium are shown. The values of the avalanche gain $<G>$ and the phase retardation required for the phase plate in the differential detection scheme, represented by $\Phi r_x - \Phi r_y$, required to maximize the SNR are shown for different magnetic film thicknesses. The values of $|r_x|^2, |r_y|^2$ and the resulting SNR are also shown for various magnetic thicknesses.

Figure 8:
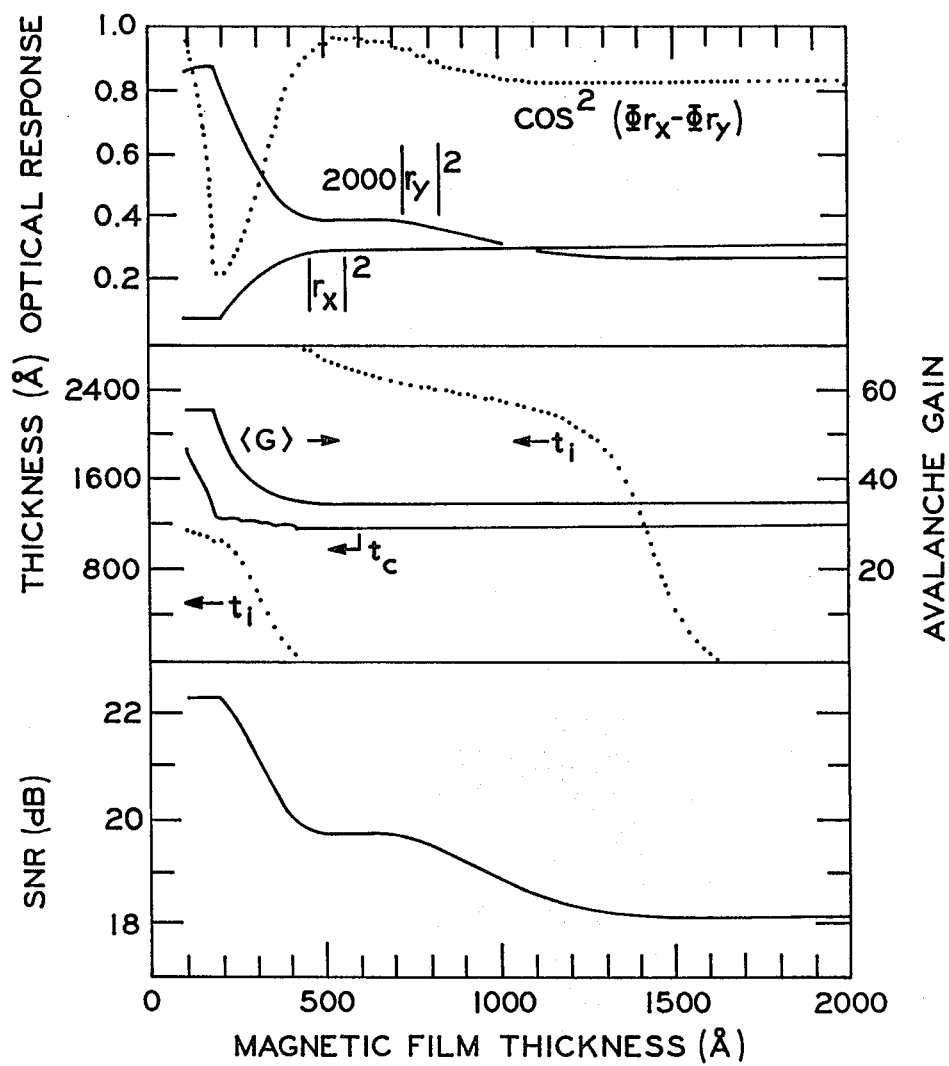
FIG. 8 is a graphic illustration of the readout characteristics for a quadrilayer magneto-optic medium employing one type of material for dielectric transparent over and under layers.
Figure 9:
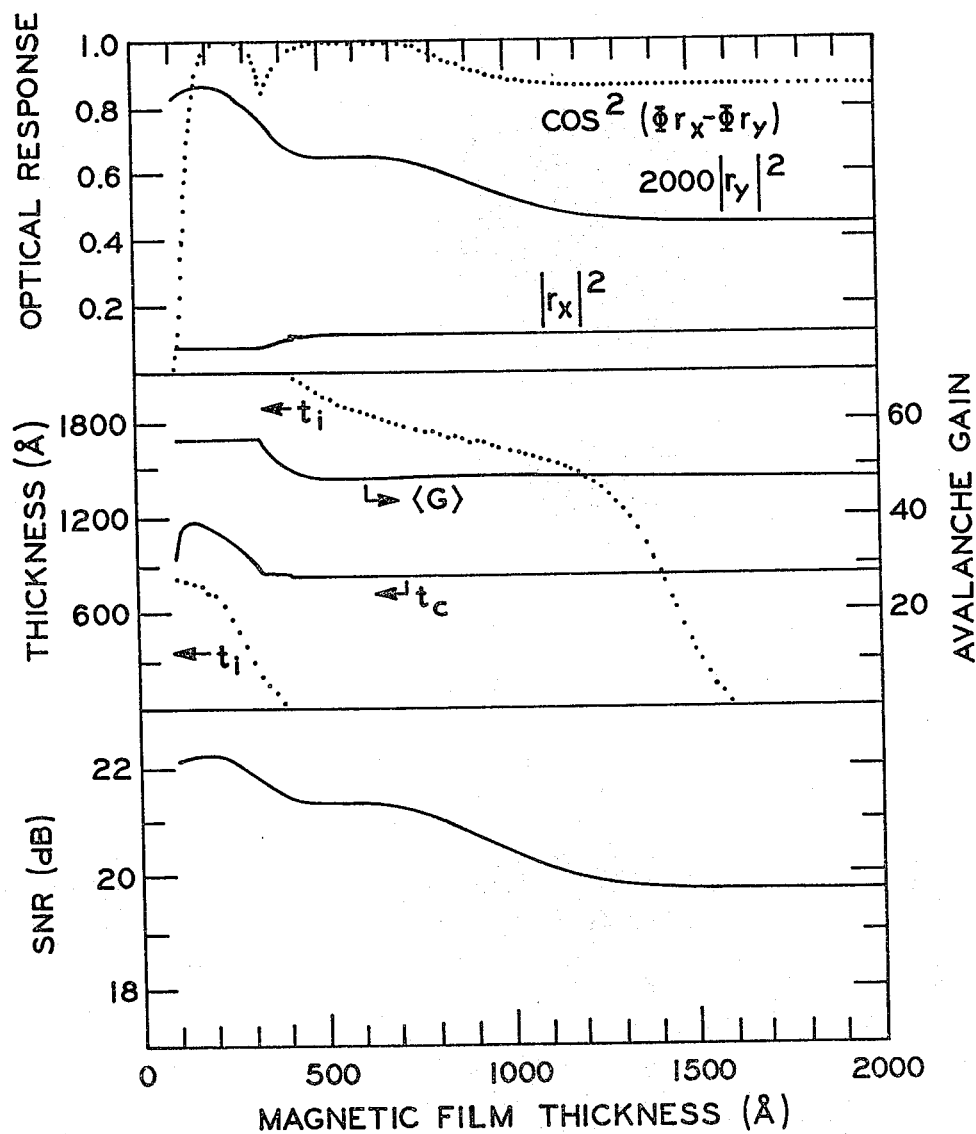
FIG. 9 is a graphic illustration of the readout characteristics for a quadrilayer magneto-optic medium employing another type of material for the dielectric transparent over and under layers.

There are several points to note, which are also applicable to the representations of FIGS. 8 and 9. At thickness above 1600 Å, where the MnBi layer is optically thick, all the parameters are constant as expected, and the SNR is about 14 db. Moreover, the phase difference between $r_x$ and $r_y$ is quite small, and the removal of the phase plate would not reduce SNR appreciably. At smaller magnetic layer thicknesses, interference effects within the metal layer become important and lead to a maximum SNR of 16.5 db, although in contrast to thick film results, an appropriately chosen phase plate is very important. The importance of the function of the phase plate in the differential detection scheme may be explained as follows. The two components, $r_x$ and $r_y$, of the reflected light from the magnetic film are not generally in phase with each other. If the phase difference between them is denoted as $\Delta\Phi$, the SNR is reduced by a factor of Cos ($\Delta\Phi$). The phase plate, when properly chosen, removes the phase difference, i.e., makes $\Delta\Phi = 0$, without effecting the magnitudes of $r_x$ and $r_y$. When $\Delta\Phi$ goes to $\pi/2$, i.e., the reflected light becomes more elliptical, the phase plate becomes a crucial component of the system of FIG. 2. An example of this is shown in FIG. 8, to be discussed next, wherein for a thickness of of about 200 Å for the magnetic layer of that media representation, Cos ($\Delta\Phi$) is about equal to zero.

As previously indicated, the origin of the increase in SNR relative to the value for a thick magnetic film, may be traced directly to the enhancement of $|r_y|^2$ since from Equation 7, SNR is approximately $|r_y|^2$ for $|r_y|^2 << |r_x|^2$. Thus, significant improvements in the SNR with multilayer interference media may be obtained if specifically designed to increase $|r_y|^2$, and earlier discussion suggests that a trilayer media would be most effective from this point of view. In practice, an overlayer is required both to fabricate an environmentally protected medium, since oxidation of the very thin magnetic layer must be prevented, and to lend a further degree of flexibility that is absent from the trilayer medium. The intuitive suggestions made previously relative to the performance for the trilayer media carry over naturally to the quadrilayer medium.

FIG. 8 shows the results for a media having about the intermediate and overcoat layers of SiO$_2$. A computer program was used to establish the values of the intermediate layer and overlayer thicknesses, $t_i$ and $t_c$ respectively, that maximize SNR for each thickness of the magnetic film. The corresponding optimum values of $<G>$ and ($\Phi r_x - \Phi r_y$) were calculated as before. Again at large thicknesses beyond 1600 Å, SNR, $|r_x|^2$ and $|r_y|^2$ are constant, and the increase of 4 db in SNR over its corresponding value in the case of the single film of FIG. 7 represents the effect of the antireflecting overlayer on the size of $|r_y|^2$. The intermediate and reflecting layers in this thick film region are inconsequential since they are optically inaccessible. At smaller thicknesses, however, they make a significant contribution to the performance of the media as can be seen from the increase in $|r_y|^2$ and the increase of SNR near and which should translate into a similar gain in the SNR. The results are even better for Sample 4.

TABLE III

Experimental and Theoretical Values of Magneto-optic Parameters of Three Media Configurations at 8400Å

| | Media Layers | | | | Reflectivity | Rotation (deg) | Ellipticity (deg) | Kerr Intensity $10^4 \times |r_y|^2$ |
|---|---|---|---|---|---|---|---|---|
| | 42 | 38 | 36 | 34 | | | | |
| 1. | — | Thick RE-TM | Thick SiO$_2$ | — | 0.60 (0.60) | 0.45 (0.45) | 0.22 (0.22) | 0.47 (0.47) |
| 2. | 1200Å SiO$_2$ | Thick RE-TM | Thick SiO$_2$ | — | 0.34 (0.32) | 1.00 (1.08) | 0.54 (0.49) | 1.34 (1.35) |
| 3. | 1200Å SiO$_2$ | 180Å RE-TM | 1100Å SiO$_2$ | Thick Al | 0.07 (0.08) | 2.84 (1.64) | 3.24 (4.00) | 3.00 (4.44) |
| 4. | 1600Å SiO$_2$ | 180Å RE-TM | 1100Å SiO$_2$ | Thick Al | 0.13 (0.11) | 2.56 (2.70) | 2.60 (2.20) | 5.50 (4.10) | below 800 Å where the thickness, $t_c$, of the overlayer is substantially constant. Thus, the improvement in the performance of the device is the result of the intermediate layer, $t_i$, appropriately coupling the light reflected from the reflecting layer back into the magnetic film. At even smaller thicknesses, where the qualitative arguments for the enhancement of $r_y$ become appropriate, SNR climbs to a maximum of 22.5 db, an increase of 8.5 db over the uncoated, thick film case of FIG. 7, and of 4.5 db over the overcoated, thick film case. The maximum gain in $|r_y|^2$ relative to its uncoated bulk value is about 9. It is of interest to note that in this connection that $|r_x|^2$ is of order $|r_y|^2$ when $|r_y|^2$ is maximized and the compromise between them is significant in maximizing SNR in Equation 7.

The results of optimization for a quadrilayer medium with SiO for the intermediate layer and overlayer is disclosed in FIG. 9. Qualitatively, the results are identical to those of FIG. 8 but there are a few quantitative differences. For instance, the plateau in the SNR between 400 Å and 700 Å magnetic film thickness is raised by about 2 db so that the difference between the absolute maximum and this level is now only 1 db. This effect is mainly due to the change in the refractive index of the overlayer. Using SiO$_2$ or any other dielectric as the material for the intermediate layer 36 has no significant effect on the SNR, presumably because this layer merely creates an appropriate phase retardation. All in all, there is much flexibility in the design of quadrilayer media which is of value in optimizing its performance as far as other system parameters are concerned.

V. Examples

A preliminary comparison of these results with experimental data on an amorphous rare earth transition metal alloy in various configurations is made in Table III. For the first three samples shown, the measured parameters of reflectivity, Kerr rotation and ellipticity compare reasonably with the calculations (shown in parenthesis in each case) in each of the three configurations previously examined, though the agreement becomes poorer as the complexity of the configuration increases. This is believed to be due to the inability to deposit the various media thin layers with sufficient accuracy and uniformity. Also, magneto-optic properties of the magnetic alloy may change at small magnetic film thicknesses. In spite of this, the predicted enhancement of the polar Kerr intensity of the quadrilayer and bilayer configurations is evident from the data in Table III. For example, the observed increase of $|r_y|^2$ for the quadrilayer configuration, Sample 3, over the value of $|r_y|^2$ for the thick magnetic film configuration, Sample 1, is about 6.5 compared with the calculated value of 9.5

The quadrilayer configurations can be designed optimally for frequencies other than 8400 Å. For example, for a frequency of 6328 Å, a quadrilayer structure with an intermediate layer (SiO$_2$) having a thickness equal to 800 Å, a magnetic layer (TbFe) having a thickness equal to 200 Å and an overlayer (SiO$_2$) having a thickness equal to 900 Å yields maximum SNR.

Figure 10:
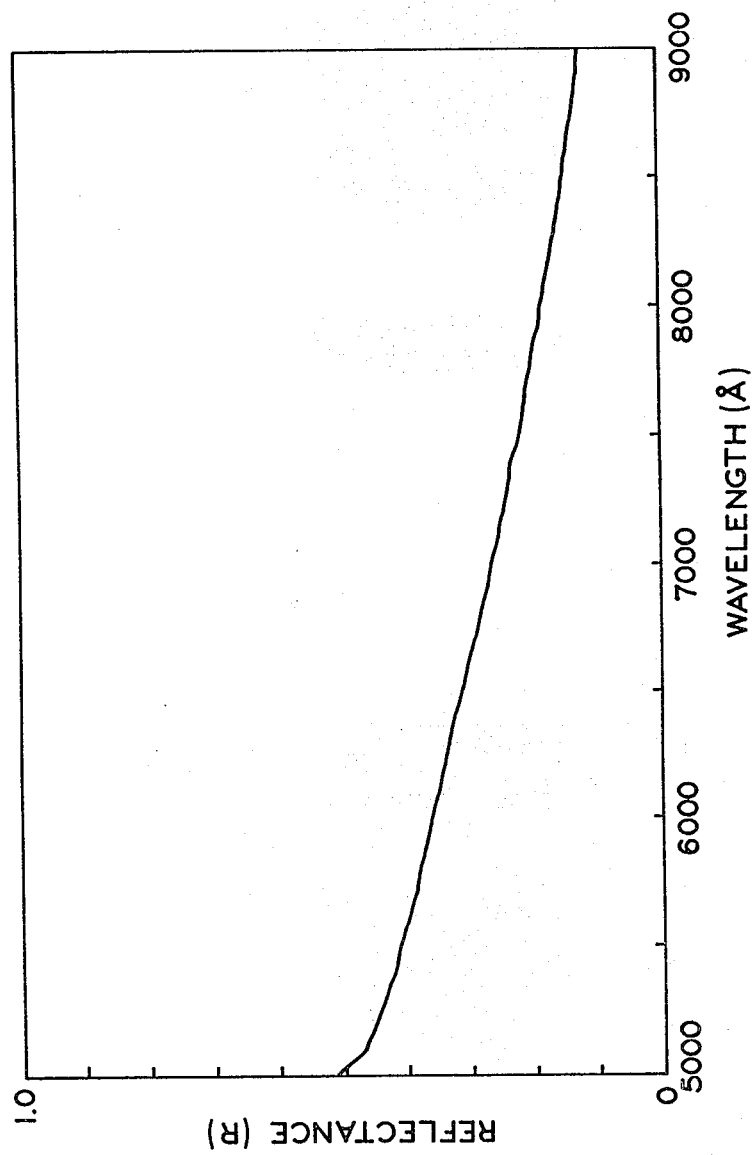
FIG. 10 is a graphic illustration of reflectance versus wavelength characteristics for an exemplified quadrilayer magneto-optic medium.
Figure 11:
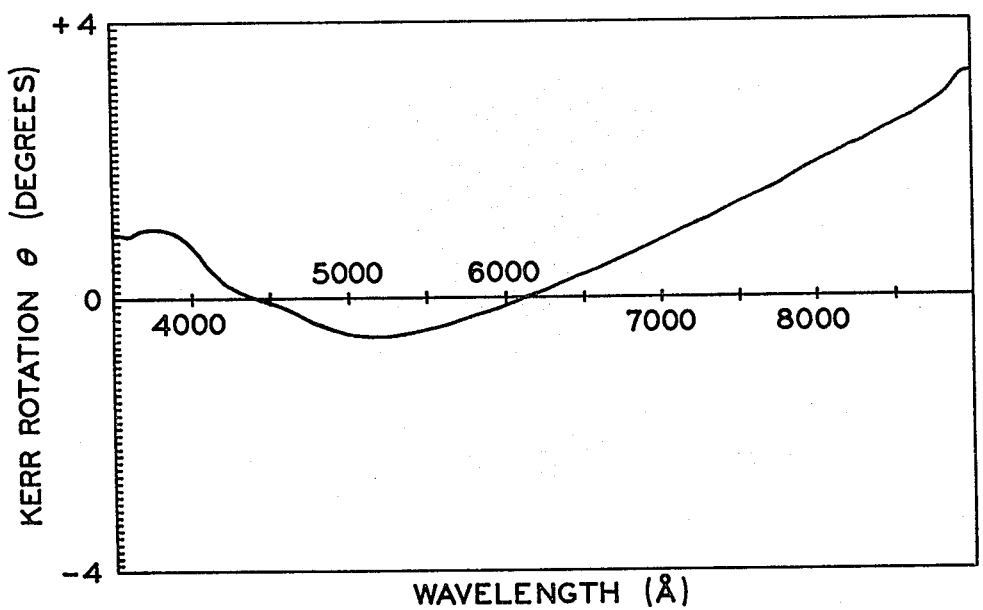
FIG. 11 is a graphic illustration of Kerr rotation versus wavelength characteristics for the exemplified quadrilayer magneto-optic medium of FIG. 10.
Figure 12:
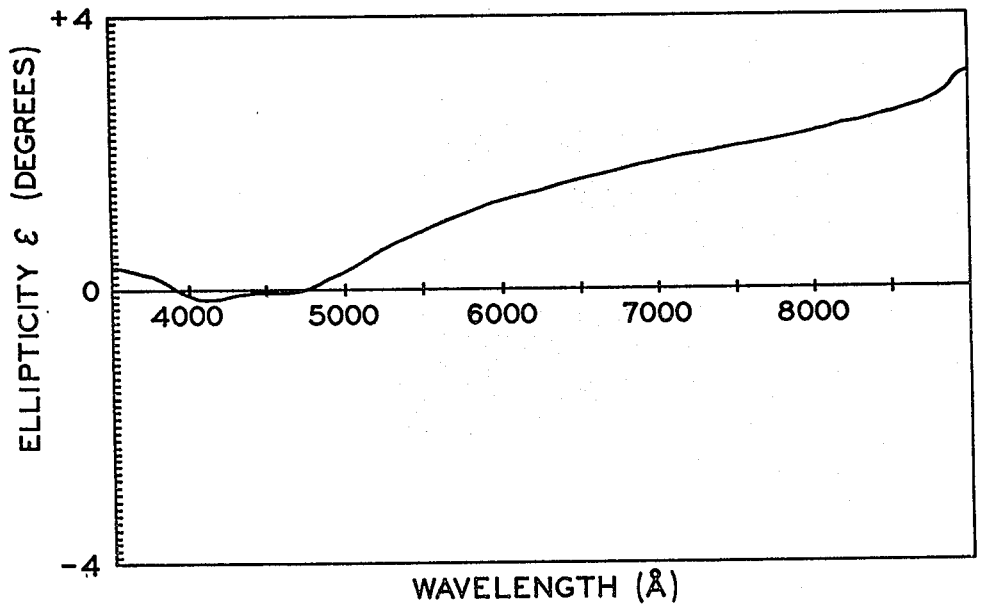
FIG. 12 is a graphic illustration of the ellipticity versus wavelength characteristics for the exemplified quadrilayer magneto-optic medium of FIG. 10.

In FIG. 10, the reflectance, R, versus wavelength is shown for Sample 4 of Table III. Reflectance is the ratio of the reflected light to the incident light which is the amount of light available for focusing, tracking and other housekeeping chores in an optical recording and readout system. Note that this is comparatively low at 8400 Å. FIGS. 11 and 12, respectively, disclose the Kerr rotation, $\theta$, and ellipticity, $\epsilon$, for Sample 4 over a range of wavelengths. Note that the degree of rotation and ellipticity is higher at 8400 Å compared to lower wavelengths. The phase plate in the system of FIG. 2 is adjusted to render these additive in phase so that $|r_y|^2$ is enhanced by the relationship $$|r_y|^2 = R(\sin^2\theta \cos^2\epsilon + \sin^2\epsilon \cos^2\theta).$$

Figure 13:
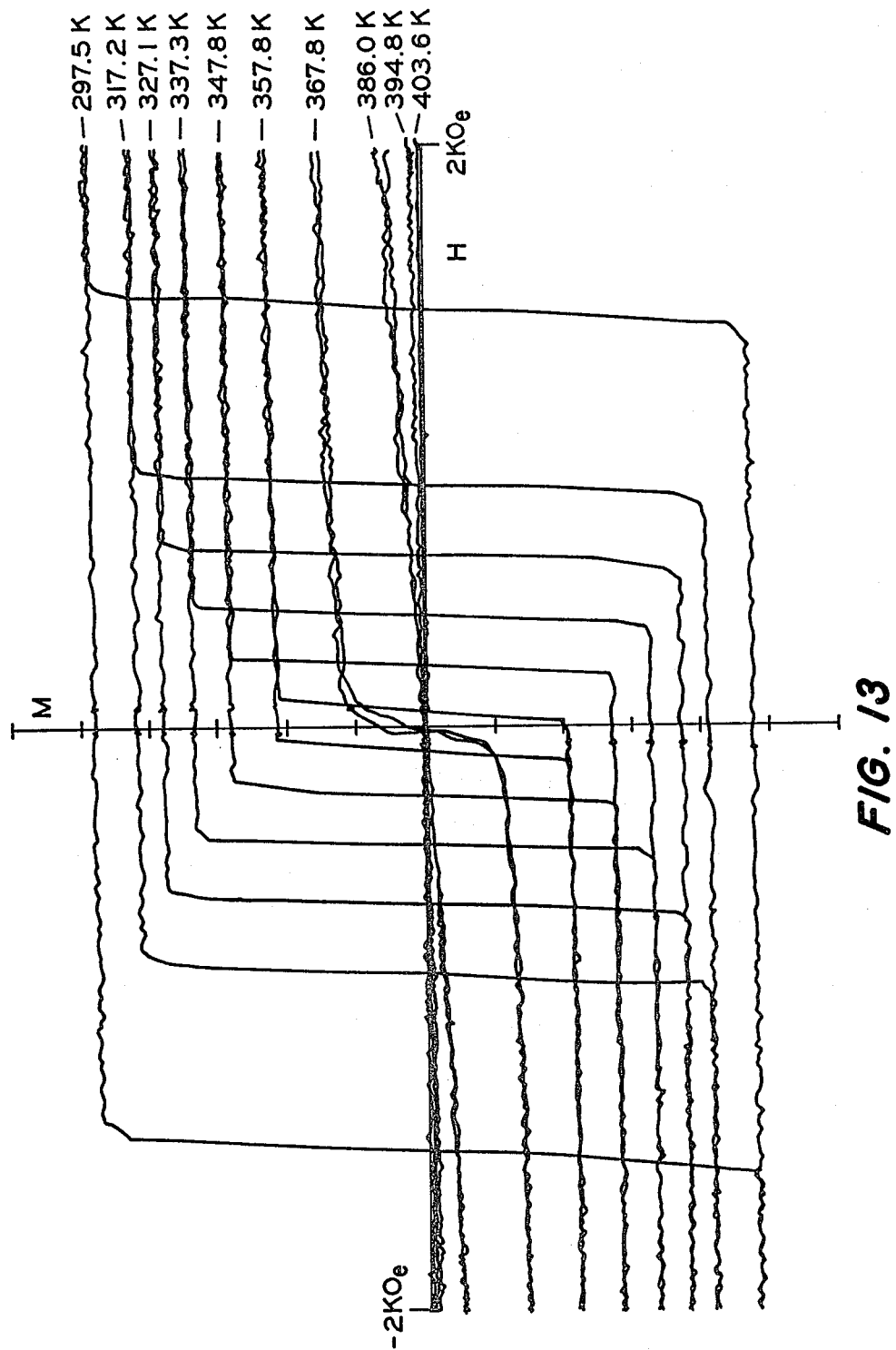
FIG. 13 is a graphic illustration of the experimental perpendicular M-H hysteresis loops at various absolute temperatures for the exemplified quadrilayer magneto-optic medium of FIG. 10.

FIG. 13 illustrates experimental data for the coercivity of the film versus temperature to determine the Curie temperature for the material comprising the magnetic layer and the perpendicular M-H hysteresis loops and coercivity values at various absolute temperatures. This data indicates that for Sample 4, the Curie temperature is about 132° C. (about 405 K). With the Curie temperature determined, design of media can be tailored to available write powers to provide a predetermined spot size, which is the subject of discussion in Section VI.

VI. Interplay of Write Characteristics and Media Optimization

As evident from the above results, considerable gains in SNR can be obtained in quadrilayer media configurations over other configurations when the laser power for readout is assumed fixed. In reality, the same material in different configurations and parameters will require different write powers and will therefore tolerate different powers for readout. This must, therefore, be taken into account for complete optimization of the medium. As a rule of thumb, the read power should be about 10% of the write power to ensure no erasure of recorded data. Using conventional thermal calculations, a quadrilayer medium can be designed to have a write sensitivity that matches the laser power available and, therefore, as much read power as is absolutely possible can be used to maximize the SNR. Such a designed medium will outperform any single or bilayer media configuration that has the same write sensitivity.

Figure 14:
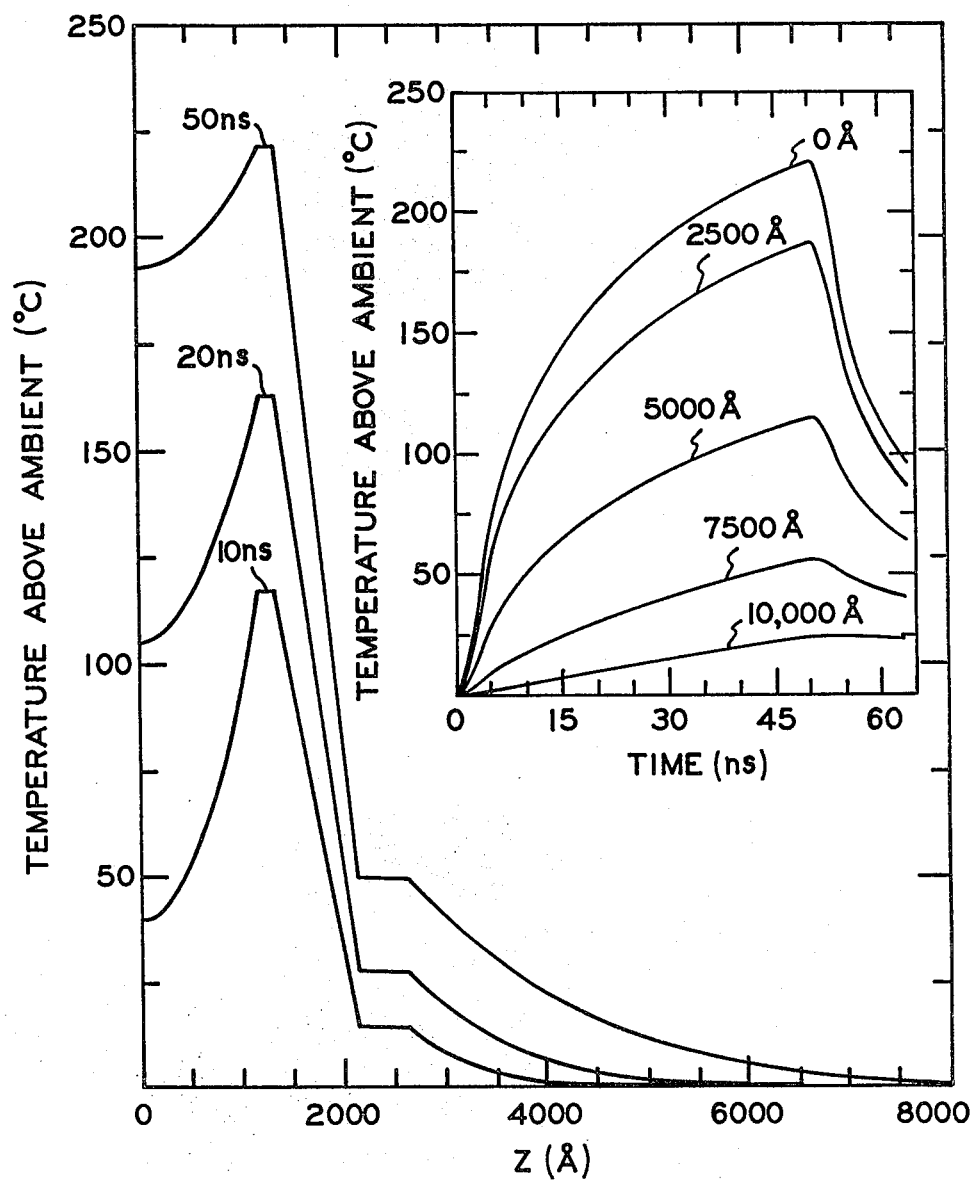
FIG. 14 is a graphic illustration of the temperature at the center of an incident laser beam on a quadrilayer medium having the characteristics disclosed in FIG. 9 measured at specific times during pulse illumination with 5 mW of laser power. The graphic insert illustration of FIG. 14 shows recording medium temperature versus time at different radii from the beam center.
Figure 15:
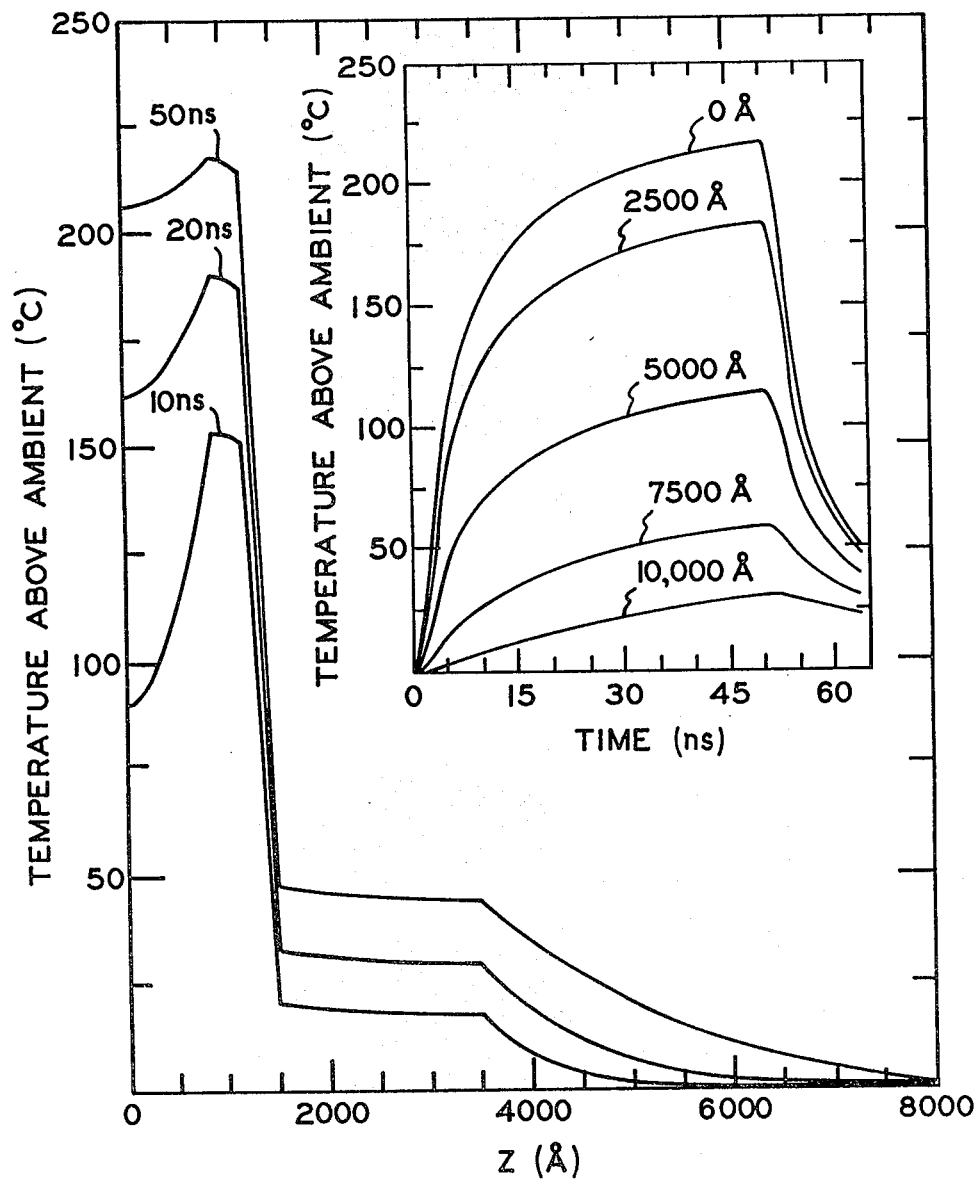
FIG. 15 is a graphic illustration of the temperature at the center of an incident laser beam on a quadrilayer medium having the characteristics disclosed in FIG. 9 measured at specific times during pulse illumination with 10 mW of laser power. The graphic insert illustration of FIG. 15 shows recording medium temperature versus time at different radii from the beam center.
Figure 16:
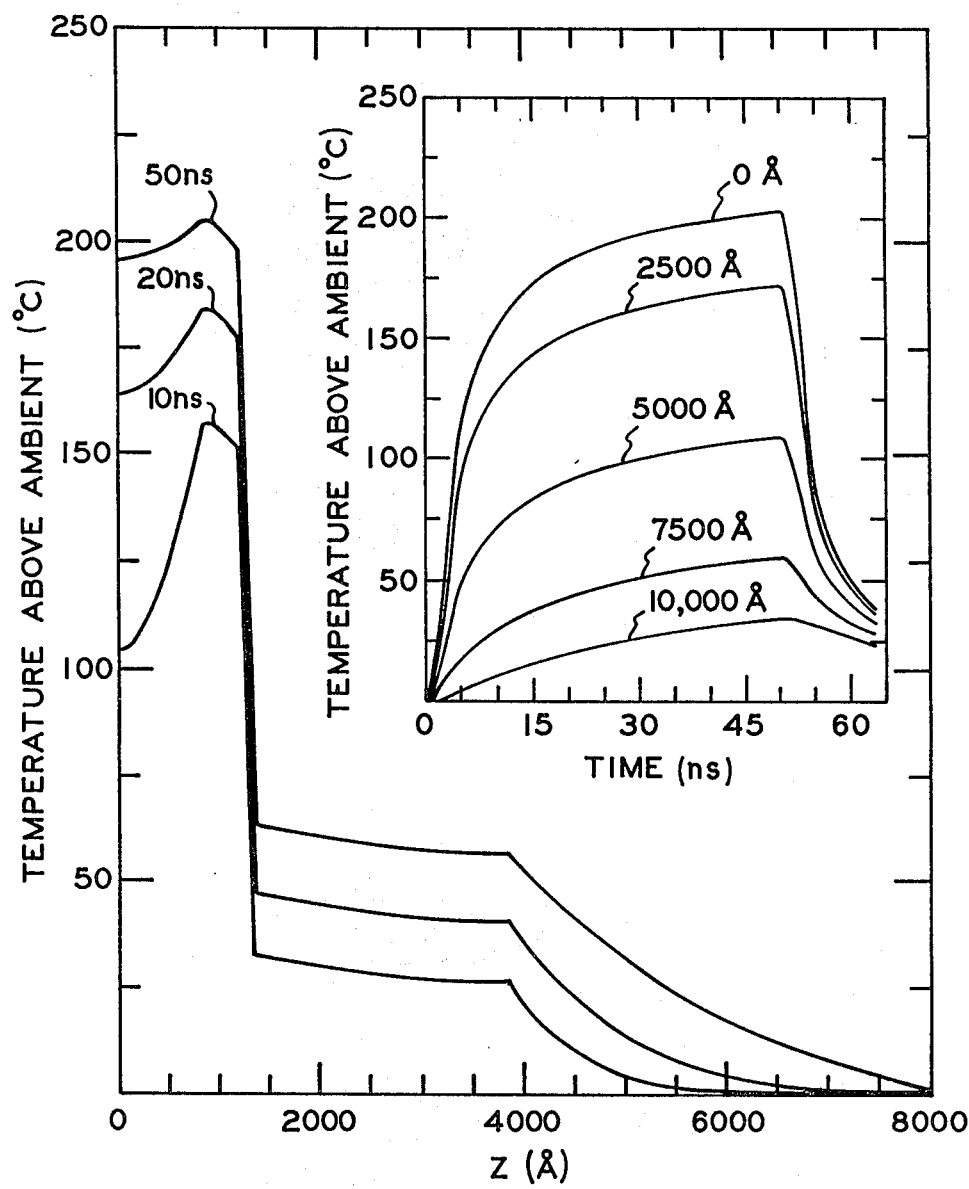
FIG. 16 is a graphic illustration of the temperature at the center of an incident laser beam on a quadrilayer medium having the characteristics disclosed in FIG. 9 measured at specific times during pulse illumination with 15 mW of laser power. The graphic insert illustration of FIG. 16 shows recording medium temperature versus time at different radii from the beam center.

FIGS. 14-16 illustrate the results of thermal calculations for three specific cases of the application of an incident write beam having, respectively, applied optical power of 5 mW, 10 mW and 15 mW applied to quadrilayer media of the type characterized by the results in FIG. 9. In each case, the Gaussian laser beam is focussed to $r_o = 5000$ Å and is incident for 50 ns. The magnetic layer is heated by the beam above its Curie temperature of about 140° C. for assured occurrence of writing. The influence of any applied magnetic field and the specific temperature dependence of demagnetizing field and coercivity are ignored since they have a relatively small effect on the eventual size of the formed spot in the media. In each configuration, the magnetic film thickness is between about 100 Å and 400 Å so that, at a read power of about 2 mW, the SNR is about 22 db. Finally, the thermal calculations are shown in each of the three cases in terms of depth profile of the temperature above ambient 25° C. at the center of the beam that exists in a quadrilayer media after 10 ns, 20 ns and 30 ns of initial plused illumination from the laser. Thus, the ambient temperature must be added in each case to the results. The insert graph in each figure shows the temperature versus time at different radii of 0 Å, 2500 Å, 5000 Å, 7500 Å and 10,000 Å from beam center.

In FIG. 14, the results are shown for the thermal calculations for a quadrilayer configuration which requires 5 mW of laser power for writing a 1μ diameter spot. In this structure the thickness of the Al layer 34 is 500 Å, the thickness, $t_i$, of the intermediate layer 36 is 800 Å, the thickness of the magnetic layer 30 is 150 Å, and the thickness, $t_c$, of the overlayer 42 is 1200 Å. From the temperature depth profile at the beam center, a maximum temperature of 250° C. is reached at the end of the laser pulse. Also, the temperature in the magnetic layer 38 is uniform in the Z direction, but, of course, decays radially. The inset shows the temperature of the magnetic film versus time at different radii from beam center. The maximum temperature achieved at a radius of 5000 Å is 140° C., the minimum temperature for writing to occur.

In FIG. 15, similar results when 10 mW of laser power are available for writing. The quadrilayer configuration 2000 Å for the Al layer thickness, 300 Å for the intermediate layer thickness, $t_i$, 300 Å for the magnetic layer thickness and 900 Å for the overlayer thickness, $t_c$. In this case, a nonuniform temperature depth profile begins to appear in the metal layers, but the temperature variation is small compared with the average temperature rise. In FIG. 16, similar results are also shown when 15 mW of laser power are available for writing. The quadrilayer configuration is 2500 Å for the Al thickness, 150 Å for the intermediate layer thickness, $t_i$, 350 Å for the magnetic layer thickness and 850 Å for the overlayer thickness, $t_c$. The nonuniform temperature depth profile in each metal layer is now even more pronounced, and also the maximum temperature at the center of the beam is lower than in previous cases, even though the temperature at a radius of 5000 Å remains at 140° C.

From these cases, it can be seen that different responses for writing have been achieved using several features of the heat usage and heat flow process in the quadrilayer configurations. First, the magnetic layer 38 itself is made thicker so that more heat is required to raise its temperature. Second, the intermediate layer 36 has been decreased in order to bring the metallic aluminum layer 34 into closer thermal proximity with the magnetic layer 38. The efficiency of the heat usage and heat flow process becomes best effective when the thickness of the intermediate layer is below about 1000 Å. Finally, the thickness of Al layer 36 is made sufficiently large to improve its characteristic as a heat sink.

Taking these attributes into consideration relative to the parameters used in the quadrilayer mediums characterized by FIGS. 14-16, there is no significant lateral heat spread in the magneto-optic layer while there is appreciable lateral heat spread in the Al reflector layer.

Thus, a trilayer and quadrilayer magneto-optic medium can be designed that consumes all the available power for writing purposes with optimized SNR conditions for media having a thickness in the range of 100 to 700 Å. Optimized readout sensitivity can be realized for many different write beam sensitivities by selecting appropriate magnetic film thickness and intermediate layer thickness while varying the thickness of the metal reflector above a minimum value of about 400 Å in accordance with the desired heat sink capacity to obtain the desired write spot size.

While the invention has been described in conjunction with specific embodiments, it is evident that many alternatives, modifications and variations will be apparent to those skilled in the art in light of the foregoing description. For example, previous discussion has been devoted to the optimization of media for a particular detection scheme. However, it should be noted that the end result is the maximization of $|r_y|^2$ for a given magneto-optic material. Since $|r_y|^2$ is the real magneto-optic response of the media, it is expected that the behavior reported for the media herein would be similar for other magneto-optic materials as well as other detection schemes. Accordingly, it is intended to embrace all such alternatives, modifications, and variations as fall within the spirit and scope of the appended claims.

What is claimed is:

1. A set of optimized magneto-optic media for use in a magneto-optic recording and readout system employing an incident readout light beam of a given fixed power, $P_o$, said beam delivered in a linearly polarized state to said magneto-optic media and the magneto-optic radiation received from said media being detectable by said system, each member of said set of media comprising a reflective layer having a predetermined thickness, a first transparent layer overlying said reflecting layer and having a predetermined thickness and refractive index, a second light transmissive layer having a predetermined thickness and exhibiting absorptivity at the wavelength of said incident readout light beam and having magneto-optic conversivity and perpendicular anisotropy, wherein the combination of said layers exhibit antireflectivity and the incident light absorbed in said media is captured in said second light transmissive layer and said predetermined layer thicknesses and refractive index are chosen to maximize SNR according to the relationship $$SNR = f(r_x, r_y, P_o, \{a_i\}^N)$$
$$i = 1$$

where $r_x$ represents the reflected component of said linearly polarized incident beam, $r_y$ represents the reflected magneto-optically induced component in an orthogonal direction, $a_i$ is the $i^{th}$ element of the set $\{a_i\}$ that represents variable parameters of said readout system, N is the number of elements in the $\{a_i\}$ and f is a function which is determined by the readout system chosen.

2. Members of the set of optimized magneto-optic media in claim 1 for which the required write power is equal to the available write beam power, said members being chosen such that the heat loss to said reflective layer during the writing pulse period is controlled to allow the temperature rise in said second transmissive layer to reach the required temperature for writing whereby said members utilize a maximum power for reading and, consequently, exhibit maximum SNR.

3. Members of the set of optimized magneto-optic media in either claims 1 or 2 in which said reflecting layer is contiguous with a substrate.

4. Members of the set of optimized magneto-optic media in claim 1 in which said reflecting layer is a substrate.

5. Members of the set of optimized magneto-optic media in claim 1 in which said readout system comprises a differential detection scheme employing photomultipliers having optimum avalanche gain, G, said gain being an element of said $$\{a_i\}_{i=1}^{N}.$$

6. Members of the set of optimized magneto-optic media in claim 1 in which said readout system includes a phase plate with a predetermined phase retardation, $\Phi_{rx} - \Phi_{ry}$, said phase retardation being an element of said $$\{a_i\}_{i=1}^{N},$$

said phase retardation selected to produce plane polarized radiation prior to detection of reflected radiation from the media.

7. Members of the set of optimized magneto-optic media of any one of the claims 1–6 wherein there is included a third transparent layer overlaying said second transmissive layer and having a predetermined thickness and refractive index.

8. Members of the set of optimized magneto-optic media in either claims 1 or 2 in which said second transmissive layer is contiguous with a transparent substrate.

9. Members of the set of optimized magneto-optic media in either claims 1 or 2 wherein there is included a third transparent layer overlaying said second transmissive layer and having a predetermined thickness and refractive index, said third transparent layer being contiguous with a transparent substrate.

10. In a magneto-optic recording and readout system employing a write/readout laser having an incident light beam of a given wavelength, said beam delivered in a polarized state to a magneto-optic recording medium, said system including means to detect the magneto-optic radiation exiting said medium, said magneto-optic recording medium comprising a substrate having a light reflecting surface at said given wavelength, a first transparent layer overlaying said reflecting surface and exhibiting light transparency at said given wavelength, a second light transmissive layer overlaying said first transmissive layer and exhibiting absorptivity and magneto-optic conversivity at said given wavelength and having perpendicular anisotropy, and wherein the combination of said layers exhibit antireflecitivity at said given frequency and the absorption of incident light is captured in said second light transmissive layer whereby both the write sensitivity of said medium and the intensity of magneto-optic radiation emitted from said medium are optimized, the optimization characterized in that the thicknesses of said first and second layers are selected such that (a) substantially all incident light is captured in said second light transmissive layer to provide the maximized creation of magneto-optic radiation in said layer, (b) the layer thickness of said second light transmissive layer is less than the absorption depth of the material comprising said second light transmissive layer whereby said magneto-optic radiation exits said layer with minimal reabsorption, (c) said magneto-optic radiation exiting normal to the plane of said second light transmissive layer in backward direction toward said reflecting surface is returned after reflection from said reflecting surface in phase with said radiation exiting normal to the plane of said layer in the forward direction out of said medium thereby increasing the total of said magneto-optic radiation in said forward direction by factor of four relative to expected magneto-optic forward radiation based on the magneto-optic characteristic of the material comprising said second light transmissive layer, (d) the angular distribution of said total emitted magneto-optic radiation is strongly concentrated in a globe centered about said forward direction of emission with a field pattern characteristic of quadrupole radiation thereby permitting maximum collection by detection means optics of finite numerical aperture employed in said system.

11. In the magneto-optic recording and readout system of claim 10 wherein said medium includes a third light transparent layer overlying said second light transmissive layer to protect the latter from the environment, said third light transparent layer having a thickness to render said third layer transparent to the optimized characteristics of said medium.

12. Apparatus for writing and reading information on a magneto-optic medium, said medium comprising a substrate having a reflective surface, a light transparent layer overlaying said reflective surface, a magnetic layer overlaying said transparent layer, the thicknesses of said layers being selected so that the magneto-optic medium performance is increased due to interference enhancement by the absorption of both incident light transmitted to said magnetic layer and reflected light from said reflective surface to said magnetic layer to maximize the magneto-optic conversivity in said magnetic layer, said magnetic layer having an easy axis of magnetization normal to its surface in one direction and wherein information is recorded as binary bits in said magnetic layer by reversal of magnetic domains in said magnetic layer via a modulated write beam focused on said medium in the presence of an oppositely opposed magnetic field, means for producing a read beam of polarized light having plane polarization in a first direction and focusing said read beam on said medium, means to collect light reflected from or transmitted through said medium from said read beam, a differential detection system to detect changes in the plane of polarization of said reflected beam as compared to the plane polarization of the transmitted light beam and produce a signal directly proportional to the intensity of the polar Kerr effect established through interaction of the transmitted light through said magnetic layer, a phase plate positioned between said reflected light focus means and said differential detection system and adjusted to render a zero phase retardation between the polar Kerr effect and the ordinarily reflected light from said medium to provide maximum signal for said differential detector system for said particularly selected medium performance thereby enhancing the signal to noise ratio.

13. The apparatus of claim 12 wherein said differential detection system comprises a polarizing beam splitter to receive said reflected light and split said light into its plane polarization orthogonal components, photodetector means to respectively receive said components, a differential amplifier having its inputs connected to the respective outputs of said photodetector means, and filter means connected to the output of said amplifier to eliminate noise components outside the signal bandwidth from said amplifier.

14. The apparatus of claim 13 wherein said photodetector means comprise avalanche diodes having an avalanche gain greater than unity.

15. The apparatus of claim 14 wherein said photodetector means comprise avalanche diodes having optimum avalanche gain.

16. The apparatus of claim 12 wherein said medium further comprises a second light transparent layer overlying said magnetic layer to protect the latter layer from the environment, said second light transparent layer having a thickness selected to render said second layer transparent to the optimized characteristics of said medium.

17. The apparatus of claim 12 wherein said substrate is devoid of said reflective surface and said read beam is focused on said medium through said substrate.

18. The apparatus of claim 16 wherein said substrate is devoid of said reflective surface and said read beam is focused on said medium through said substrate.

19. The apparatus of claim 12 wherein said reflective surface is a metal layer, the thickness of said layers and said metal layer being selected to allow maximum power, $P_0$, usage for writing purposes while obtaining maximum readout beam power and sensitivity for a desired write spot size.

20. Apparatus for reading information on a magneto-optic medium, said medium comprising a substrate having a reflective surface, a first light transparent layer overlying said reflective surface, a light transmissive layer overlying said first transparent layer and exhibiting absorptivity at the wavelength of said read beam, the thicknesses of said transparent and transmissive layers being chosen to provide maximum magneto-optic conversivity in said magnetic layer, means for producing a read beam of polarized light having plane polarization in a first direction and focusing said read beam on said medium, means to collect light reflected from or transmitted through said medium from said read beam, a differential detection system to detect changes in the plane of polarization of said reflected beam as compared to the plane polarization of the transmitted light beam and produce a signal directly proportional to the intensity of the polar Kerr effect established through interaction of the transmitted light through said magnetic layer, a phase plate positioned between said reflected light focus means and said differential detection system and adjusted to render a zero phase retardation between the polar Kerr effect and the ordinarily reflected light from said medium to provide maximum signal for said differential detection system for said particularly selected medium performance thereby enhancing the signal to noise ratio.

21. The apparatus of claim 19 wherein said substrate is devoid of said reflective surface and said read beam is focused on said medium through said substrate.

22. The apparatus of claim 19 wherein said reflective surface is a metal layer, the thicknesses of said layers and said metal layer being selected to allow maximum power, $P_0$, usage for writing purposes while obtaining maximum readout beam power and sensitivity for a desired write spot size.

23. Apparatus for reading information on a magneto-optic medium, said medium comprising a substrate having a reflective surface, a light transparent layer overlying said reflective surface, a magnetic layer overlying said transparent layer, the thicknesses of said layers being selected so that the magneto-optic medium performance is increased due to interference enhancement by the absorption of both incident light transmitted to said magnetic layer and reflected light from said reflective surface to said magnetic layer to maximize the magneto-optic conversivity in said magnetic layer, means for producing a read beam of polarized light having plane polarization in a first direction and focusing said read beam on said medium, means to collect light reflected from or transmitted through said medium from said read beam, a differential detection system to detect changes in the plane of polarization of said reflected beam as compared to the plane polarization of the transmitted light beam and produce a signal directly proportional to the intensity of the polar Kerr effect established through interaction of the transmitted light through said magnetic layer.

24. Apparatus for writing and reading information on a magneto-optic medium,
    said medium comprising
        a substrate having a reflective surface,
        a first light transparent layer overlying said reflective surface,
        a magnetic layer overlying said first transparent layer and exhibiting absorptivity at the wavelength of said read beam,
        a second light transparent layer overlying said magnetic layer to protect the latter layer from the environment,
        said second light transparent layer having a thickness selected to render said second layer transparent to the optimized characteristics of said medium,
        the thicknesses of said first transparent layer and said magnetic layer being selected so that the magneto-optic medium performance is increased due to interference enhancement by the absorption of both incident light transmitted to said magnetic layer and reflected light from said reflective surface to said magnetic layer to maximize the magneto-optic conversivity in said magnetic layer,
        the thicknesses of said first transparent layer and said magnetic layer being sufficiently large so as to not to be creative of any significant amount of elliptically polarized light through interaction of the transmitted light through said magnetic layer,
        said magnetic layer having an easy axis of magnetization normal to its surface in one direction and wherein information is recorded as binary bits in said magnetic layer by reversal of magnetic domains in said magnetic layer via a modulated write beam focused on said medium in the presence of an oppositely opposed magnetic field,
        means for producing a read beam of polarized light having plane polarization in a first direction and focusing said read beam on said medium,
        means to focus light reflected from said medium from said read beam,
        a differential detection system to detect changes in the plane of polarization of said reflected beam as compared to the plane polarization of the transmitted light beam and produce a signal directly proportional to the intensity of the polar Kerr effect established through interaction of the transmitted light through said magnetic layer.

25. Apparatus for writing and reading information on a magneto-optic medium,
    said medium comprising
        a substrate having a reflective surface,
        a magnetic layer overlying said reflective surface and exhibiting absorptivity at the wavelength of said read beam,
        a light transparent layer overlying said magnetic layer to protect the latter layer from the environment,
        said light transparent layer having a thickness selected to render said second layer transparent to the optimized characteristics of said medium,
        the thickness of said magnetic layer being selected so that the magneto-optic medium performance is increased due to interference enhancement by the absorption of both incident light transmitted to said magnetic layer and reflected light from said reflective surface to said magnetic layer to maximize the magneto-optic conversivity in said magnetic layer,
        the thickness of said magnetic layer being sufficiently large so as to not to be creative of any significant amount of elliptically polarized light through interaction of the transmitted light through said magnetic layer,
        said magnetic layer having an easy axis of magnetization normal to its surface in one direction and wherein information is recorded as binary bits in said magnetic layer by reversal of magnetic domains in said magnetic layer via a modulated write beam focused on said medium in the presence of an oppositely opposed magnetic field,
        means for producing a read beam of polarized light having plane polarization in a first direction and focusing said read beam on said medium,
        means to focus light reflected from said medium from said read beam,
        a differential detection system to detect changes in the plane of polarization of said reflected beam as compared to the plane polarization of the transmitted light beam and produce a signal directly proportional to the intensity of the polar Kerr effect established through interaction of the transmitted light through said magnetic layer.

* * * * *